United States Patent
Smith et al.

(10) Patent No.: US 11,533,316 B2
(45) Date of Patent: Dec. 20, 2022

(54) INFORMATION-CENTRIC NETWORK NAMESPACE POLICY-BASED CONTENT DELIVERY

(71) Applicant: Intel Corporation, Santa Clara, CA (US)

(72) Inventors: Ned M. Smith, Beaverton, OR (US); Srikathyayani Srikanteswara, Portland, OR (US); Ravikumar Balakrishnan, Beaverton, OR (US); Rajesh Poornachandran, Portland, OR (US); Moreno Ambrosin, Kirkland, WA (US)

(73) Assignee: Intel Corporation, Santa Clara, CA (US)

(*) Notice: Subject to any disclaimer, the term of this patent is extended or adjusted under 35 U.S.C. 154(b) by 687 days.

(21) Appl. No.: 16/455,211

(22) Filed: Jun. 27, 2019

(65) Prior Publication Data

US 2019/0319964 A1    Oct. 17, 2019

(51) Int. Cl.
*H04L 9/40* (2022.01)
*H04L 9/32* (2006.01)
*H04L 69/22* (2022.01)
*H04W 60/00* (2009.01)

(52) U.S. Cl.
CPC ........ *H04L 63/105* (2013.01); *H04L 9/3247* (2013.01); *H04L 69/22* (2013.01); *H04W 60/00* (2013.01)

(58) Field of Classification Search
None
See application file for complete search history.

(56) References Cited

U.S. PATENT DOCUMENTS

| 7,509,491 B1* | 3/2009 | Wainner | H04L 63/0272 |
| | | | 713/163 |
| 11,018,886 B1* | 5/2021 | Wijnands | H04L 12/185 |

(Continued)

OTHER PUBLICATIONS

Ghali, Cesar et al. "Interest-Based Access Control for Content-Centric Networks" [online] Sigcomm, May 23, 2015 [retrieved Jan. 14, 2022]. Retrieved from the Internet: URL: http://conferences2.sigcomm.org/acm-icn/2015/proceedings/p147-ghali.pdf (Year: 2015).*

(Continued)

*Primary Examiner* — Taghi T Arani
*Assistant Examiner* — Joshua Raymond White
(74) *Attorney, Agent, or Firm* — Schwegman Lundberg & Woessner, P.A.

(57) ABSTRACT

Systems and techniques for information-centric network namespace policy-based content delivery are described herein. A registration request may be received from a node on an information-centric network (ICN). Credentials of the node may be validated. The node may be registered with the ICN based on results of the validation. A set of content items associated with the node may be registered with the ICN. An interest packet may be received from a consumer node for a content item of the set of content items that includes an interest packet security level for the content item. Compliance of the security level of the node with the interest packet security level may be determined. The content item may be transmitted to the consumer node.

21 Claims, 17 Drawing Sheets

(56) References Cited

U.S. PATENT DOCUMENTS

| | | | | |
|---|---|---|---|---|
| 2011/0178930 A1* | 7/2011 | Scheidt | ............... | H04L 63/061 |
| | | | | 705/50 |
| 2012/0174181 A1* | 7/2012 | Zhang | .................. | H04L 9/3247 |
| | | | | 726/1 |
| 2014/0196127 A1* | 7/2014 | Smeets | .............. | H04L 63/0815 |
| | | | | 726/5 |

OTHER PUBLICATIONS

Lou, Junjun et al. "A Blockchain-based key Management Scheme for Named Data Networking" [online] IEEE, Aug. 15, 2018 [retrieved Jan. 14, 2022]. Retrieved from the Internet: URL: https://ieeexplore.ieee.org/stamp/stamp.jsp?tp=&arnumber=8605993 (Year: 2018).*

Wang, Yu et al. "Session-based Access Control in Information-Centric Networks: Design and Analyses" [online] IEEE, Jan. 22, 2015 [retrieved Jan. 14, 2022]. Retrieved from the Internet: URL: https://ieeexplore.ieee.org/stamp/stamp.jsp?tp=&arnumber=7017094 (Year: 2015).*

Tourani, Reza et al. "Security Privacy, and Access Control in Information-Centric Networking: A Survey" [online] IEEE, Sep. 7, 2015 [retrieved Jan. 14, 2022]. Retrieved from the Internet: URL: https://ieeexplore.ieee.org/stamp/stamp.jsp?tp=&arnumber=8027034 (Year: 2015).*

Aiash, Mahdi et al. "A Formally Verified Access Control Mechanism for Information Centric Networks" [online] IEEE, Jul. 20, 2015 [retrieved Jan. 14, 2022]. Retrieved from the Internet: URL: https://ieeexplore.ieee.org/stamp/stamp.jsp?tp=&arnumber=7518060 (Year: 2015).*

* cited by examiner

INFORMATION-CENTRIC NETWORK NAMESPACE POLICY-BASED CONTENT DELIVERY

TECHNICAL FIELD

Embodiments described herein generally relate to information-centric networking and, in some embodiments, more specifically to namespace policy-based content delivery in information-centric data networks.

BACKGROUND

Client computing devices may be connected to data networks for accessing data that may be stored on a remote computing device. A request for data may travel through a collection of routing devices between a requesting client computing device and the remote computing device. Traditionally, the data may be requested by identifying the remote computing device by a hostname that may be resolved to a network address. The request may then be transmitted to the remote computing device via its network address.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Multi-level secure content is an emerging opportunity for information-centric networks (ICNs). A challenge facing multi-level secure ICN routing is ensuring interest and data packet contents include multi-level security labeling and, where routing nodes incorporate multi-level secure access semantics, ensuring non-authorized routing and endpoint nodes are less likely to be exposed to possible covert-channel analysis and misdirected packets.

Multi-level security relies on content labels that identify data sensitivity and classification. The systems and techniques discussed herein provide content label metadata that provide routing policies that enforce security models for protecting sensitive information. The solution allows a per-packet security level to be specified that may be used to enforce packet access policies at the routing level. ICNs may more easily be integrated with information systems requiring multi-level data such as, for example, energy, military, political, critical infrastructure, financial, etc.

To ensure multi-level security labeling, interest and data packets are used that contain metadata labels that identify a security level of the packet. Multi-level security uses content labels to identify and classify content that is intended for consumption at a particular (or a range of particular) security level(s). The content label differs depending on the type of security model. Non-limiting examples include: 1) A Bell-LaPadula security model where interest and data packets include metadata labels consisting of a classification and category (e.g., SECRET:HR), and where routing nodes forward pending interest table (PIT) entries if the router node is authorized to handle that classification. Routers may be authorized to handle a range (but not a full range) of classification labels. 2) A Biba Integrity model in which an integrity label identifies sensitive data based on a quality metric (e.g., "clean," "dirty," "semi-dirty") and ensures "dirty" data cannot be shared with nodes authorized for handling "clean" data.

Label authorization is achieved using certificates containing label authorization or by using group signing schemes where the content label is signed using a key that represents the content type. For example, KeyTOPSECRET may be used for Top Secret content and KeyUNCLASSIFIED may be used for unclassified content.

Routing nodes have the ability to consume the labels, verify their signatures, and apply an appropriate routing policy that aligns with the security policy. For example, in the Bell-LaPadula security model, UNCLASSIFIED nodes are not authorized to view TOPSECRET data. Therefore, the routing node receiving TOPSECRET interest packets would not forward these interest packets to the UNCLASSIFIED node. In the Biba Integrity Model, a HIGH integrity data item should not be updated by a LOW integrity data item. Therefore, LOW integrity data packets would not be delivered to HIGH integrity nodes.

Figure 1:
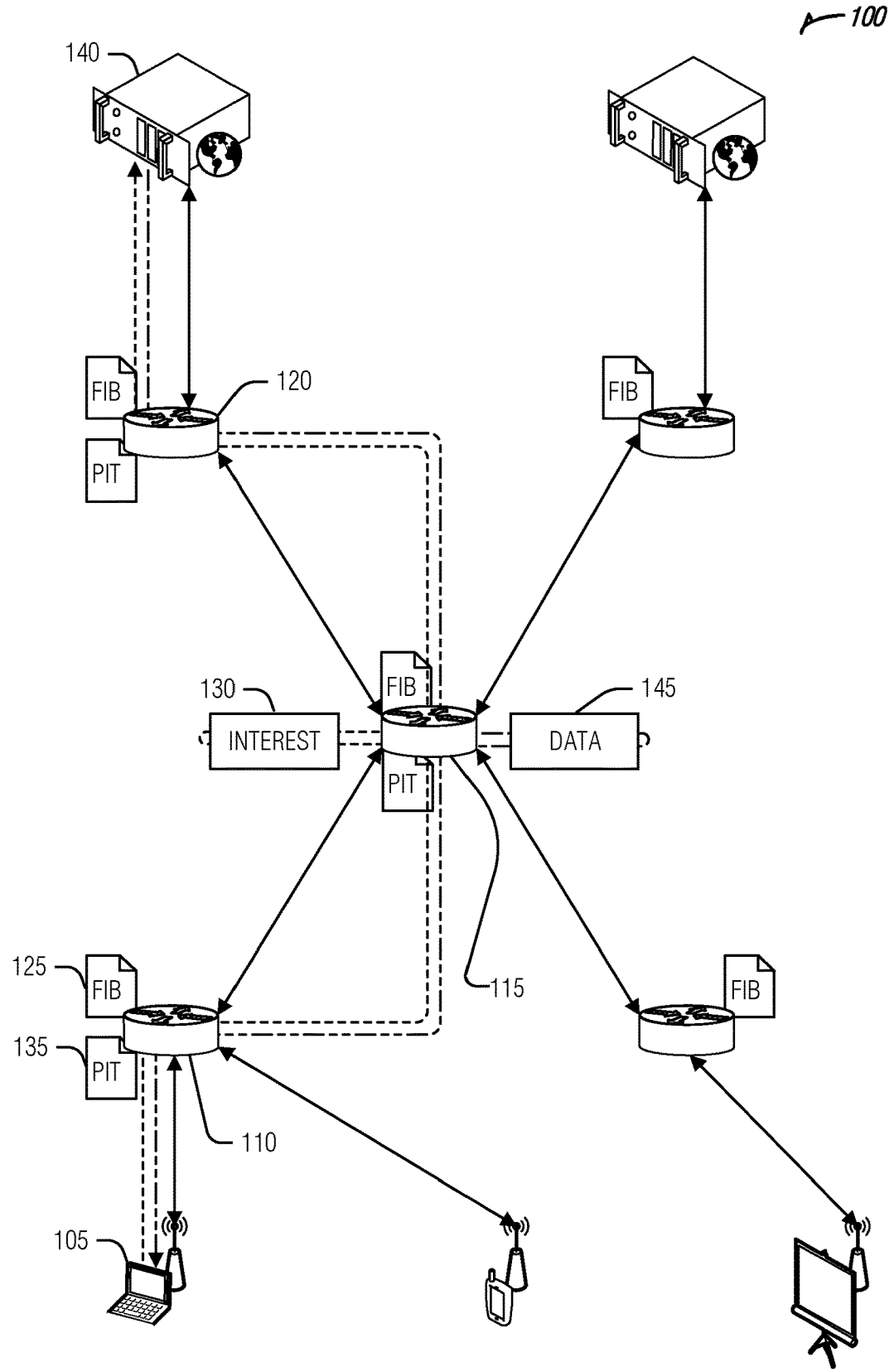
FIG. 1 illustrates an example of an information-centric network (ICN) for information-centric network namespace policy-based content delivery, according to an embodiment.

FIG. 1 illustrates an example of an information-centric network (ICN) 100 for information-centric network namespace policy-based content delivery, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 105 (e.g., subscriber) requests named content from the network itself. The content request may be called an interest and transmitted via an interest packet 130. As the interest packet traverses network devices (e.g., network elements, routers, switches, hubs, etc.)—such as network elements 110, 115, and 120—a record of the interest is kept, for example, in a pending interest table (PIT) at each network element. Thus, network element 110 maintains an entry in its PIT 135 for the interest packet 130, network element 115 maintains the entry in its PIT, and network element 120 maintains the entry in its PIT.

When a device, such as publisher device 140, that has content matching the name in the interest packet 130 is encountered, that publisher device 140 may send a data packet 145 in response to the interest packet 130. Typically, the data packet 145 is tracked back through the network to the source (e.g., device 105) by following the traces of the interest packet 130 left in the network element PITs. Thus, the PIT 135 at each network element establishes a trail back to the subscriber 105 for the data packet 145 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 130 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 130 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 130 to data cached in the ICN element. Thus, for example, if the data named in the interest 130 is cached in network element 115, then the network element 115 will return the data in a data packet 145 to the subscriber 105 via the network element 110. However, if the data is not cached at network element 115, the network element 115 routes the interest 130 on (e.g., to network element 120). To facilitate routing, the network elements may use a forwarding information base 125 (FIB) to match named data to an interface (e.g., physical port) for the route. Thus, the FIB 125 operates much like a routing table on a traditional network device.

In an example, additional metadata may be attached to the interest packet 130, the cached data, or the route (e.g., in the FIB 125), to provide an additional level of matching. For example, the data name may be specified as "www.somedomain.com or videos or v8675309," but also include a version number—or timestamp, time range, endorsement, etc. In this example, the interest packet 130 may specify the desired name, the version number, or the version range. The matching may then locate routes or cached data matching the name and perform the additional comparison of metadata or the like to arrive at an ultimate decision as to whether data or a route matches the interest packet 130 for respectively responding to the interest packet 130 with the data packet 145 or forwarding the interest packet 130.

ICN has advantages over host-based networking because the data segments are individually named. This enables aggressive caching throughout the network as a network element may provide a data packet 130 in response to an interest 130 as easily as an original author. Accordingly, it is less likely that the same segment of the network will transmit duplicates of the same data requested by different devices.

Fine grained encryption is another feature of many ICN networks. A typical data packet 145 includes a name for the data that matches the name in the interest packet 130. Further, the data packet 145 includes the requested data and may include additional information to filter similarly named data (e.g., by creation time, expiration time, version, etc.). To address malicious entities providing false information under the same name, the data packet 145 may also encrypt its contents with a publisher key or provide a cryptographic hash of the data and the name. Thus, knowing the key (e.g., from a certificate of an expected publisher 140) enables the recipient to ascertain whether the data is from that publisher 140. This technique also facilitates the aggressive caching of the data packets 145 throughout the network because each data packet 145 is self-contained and secure. In contrast, many host-based networks rely on encrypting a connection between two hosts to secure communications. This may increase latencies while connections are being established and prevents data caching by hiding the data from the network elements.

Information-centric networking (ICN) is a networking platform that transitions from a host-centric content delivery model and to an information-centric model for content delivery. The end-to-end connectivity of modern computer networks allows for delivery of information that is independent of location, application, storage, and transportation means. Content is requested by a consumer device by submitting an interest packet that provides the information needed (e.g., a name, identifier, category, etc.) to retrieve content. In response, a node containing the content (e.g., a producer node, cache node, etc.) returns a data packet including the content. This reduces the reliance on specific hosts to provide content to a requester and allows data to be propagated throughout the ICN to nodes that may most efficiently delivery the content to consumer nodes. ICN may enable Named Data Networking (NDN) technology.

NDN, as specified in the NDN technical report DND-0001, is a networking architecture that enables communications by named secured data at the network layer. By aligning the network services with application needs, NDN may offer advantages over host-centric networks such as, for example, stronger security and trustworthiness, enhanced network usability, enhanced scalability, and increased resiliency in network communication. NDN is especially suitable for emerging network environments such as edge computing, Internet of Things (IoT), and other data intensive distributed networks.

Other example ICN networks include content centric networking (CCN), as specified in the Internet Engineering Task Force (IETF) draft specifications for CCNx 0.x and CCN 1.x, Data-Oriented Network Architecture (DONA), as presented at proceedings of the 2007 Association for Computing Machinery's (ACM) Special Interest Group on Data Communications (SIGCOMM) conference on Applications, technologies, architectures, and protocols for computer communications, Named Functions Networking (NFN), 4WARD, Content Aware Searching, Retrieval and Streaming (COAST), Convergence of Fixed and Mobile Broadband Access/Aggregation Networks (COMBO), Content Mediator Architecture for Content-Aware Networks (COMET), CONVERGENCE, GreenICN, Network of Information (NetInf), IP Over ICN (POINT), Publish-Subscribe Internet Routing Paradigm (PSIRP), Publish Subscribe Internet Technology (PURSUIT), Scalable and Adaptive Internet Solutions (SAIL), Universal, Mobile-Centric and Opportunistic Communications Architecture (UMOBILE), etc.

Figure 2:
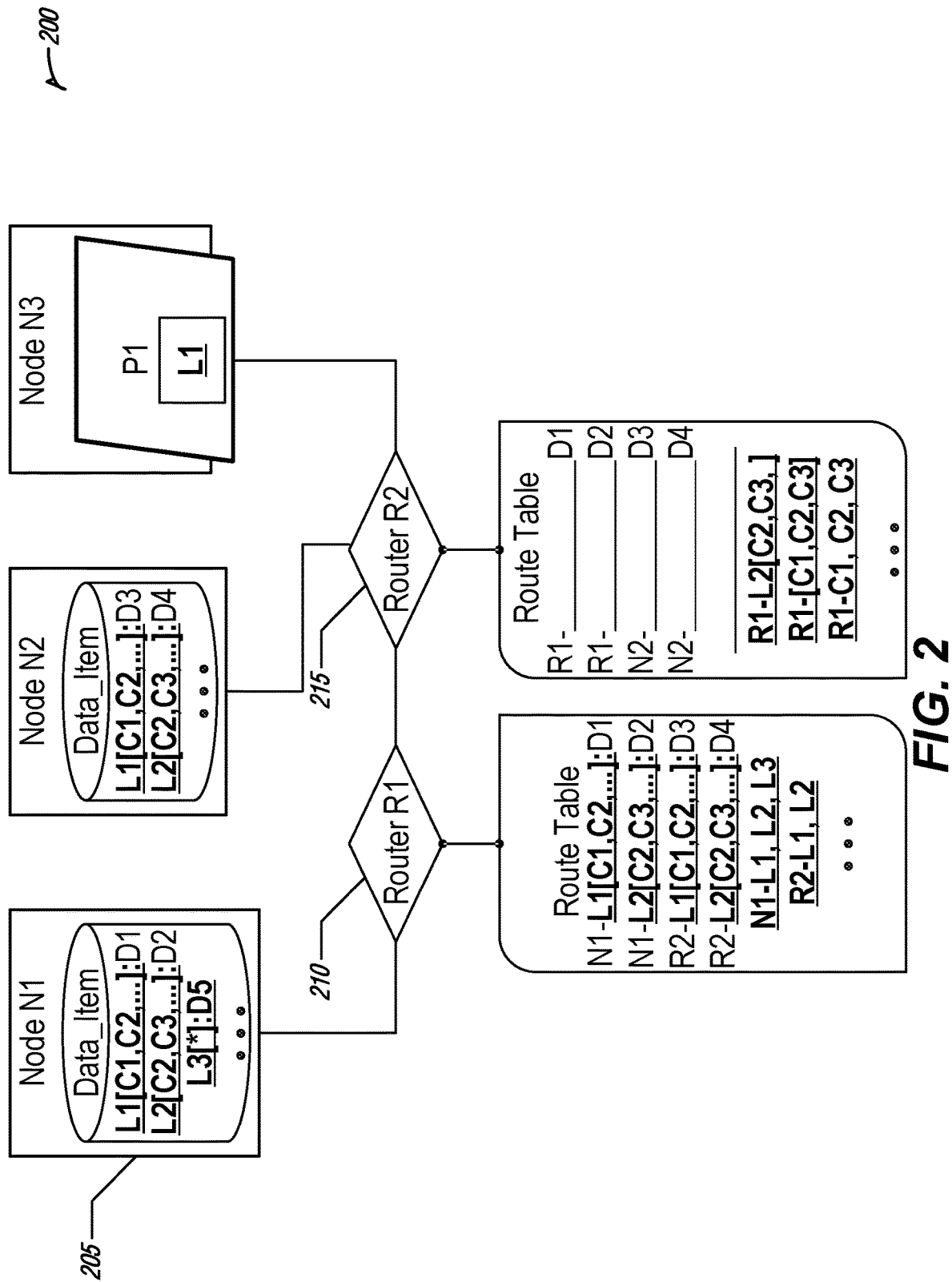
FIG. 2 illustrates an ICN with security-labeled data items for information-centric network namespace policy-based content delivery, according to an embodiment.

FIG. 2 illustrates an ICN 200 with security-labeled data items for information-centric network namespace policy-based content delivery, according to an embodiment. For example, a Node N1 205 has a data item D1 with the label L1[C1,C2] where L1 is a security level and C1, C2 are categories. Categories may be thought of as groups.

Different data items may have different security labels. Routing node R1 210 and routing node R2 215 include security labeling in the routing table and caches. Routing logic allows interest in data to be expressed based on data name but also in terms of label names (e.g., level and category).

Figure 3:
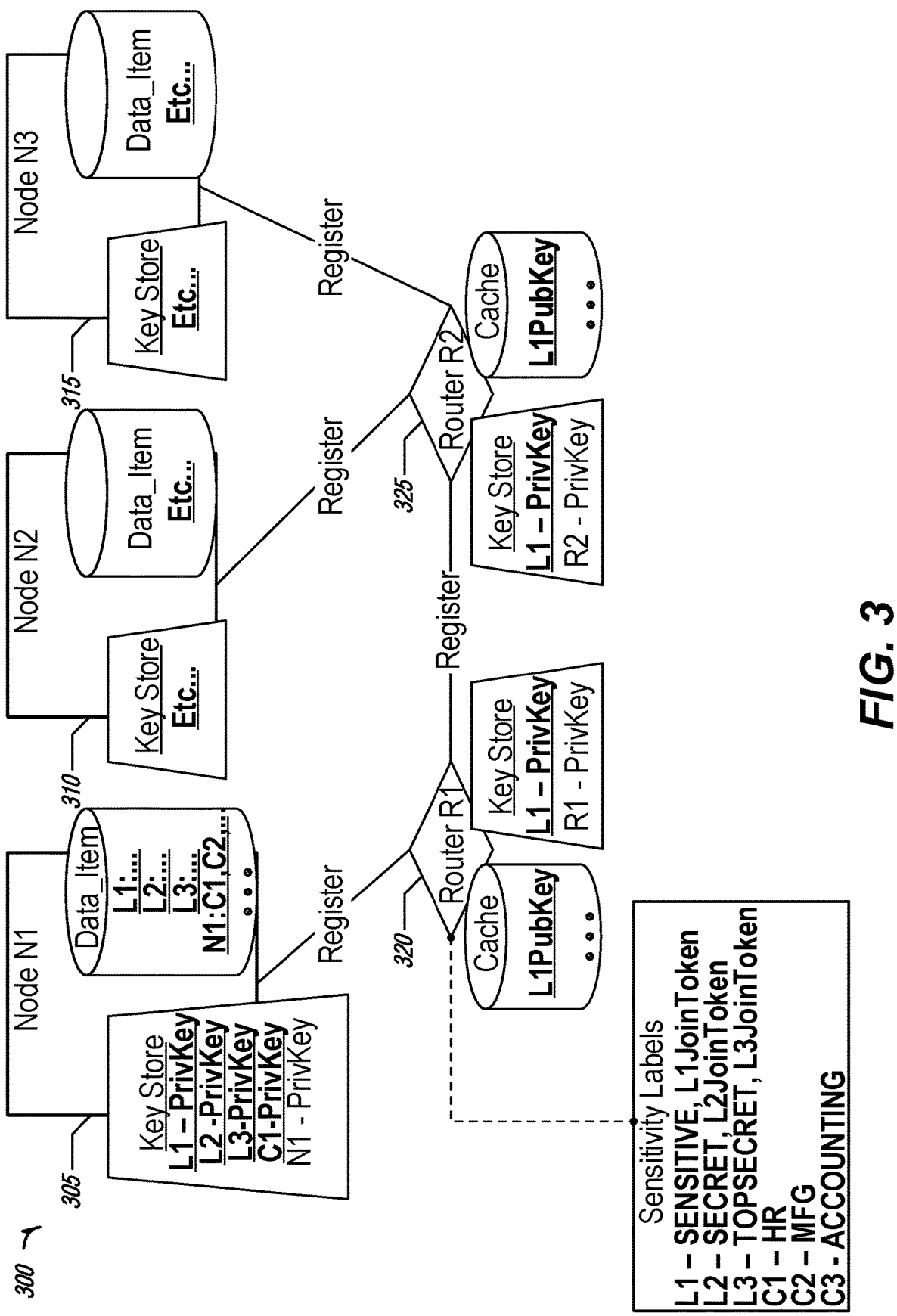
FIG. 3 illustrates an example of registration to an ICN that enforces security-labeled content for information-centric network namespace policy-based content delivery, according to an embodiment.

FIG. 3 illustrates an example of registration to an ICN 300 that enforces security-labeled content for information-centric network namespace policy-based content delivery, according to an embodiment. FIG. 3 shows nodes (e.g., Node N1 305, Node N2 310, and Node N3 315) and routers (e.g., Router R1 320 and Router R2 325) registering to participate in the ICN 300. Registration includes each node providing credentials showing the security levels and categories each is authorized to handle. In this example, Router R1 320 is acting as a registration authority, but any node could serve this role. The registration authority defines the security label (e.g., levels, categories, etc.) according to the application context. This example shows three levels of sensitivity and three categories (e,g,. HR, MFG, and ACCOUNTING). Content held by nodes is also registered so it may be included in routing tables and caches.

Routers may implement security enforcement policies that align with well-known security models to implement mandatory access control over the ICN 300. For example, Node N3 315 may be authorized for L1 but not L3 and shows interest in L1. Router R2 325 may verify a signature over a Node N3 315 interest packet that contains the security level range (L1-L2) and authorized categories (C1-C3). If Node N3 315 shows interest in L3 content in Node N1 305, the router would refuse to forward the interest packet because Node N3 315 is not authorized to view any content higher than L2 (SECRET).

In another example, Node N3 315 may be authorized to read Node N1 305 data. Node N1 305 may encrypt the data payload using a public key of Node N3 315 (only N3 may decrypt), and sign the packet with a private key of Node N1 305 so that Node N3 315 may authenticate it. The security label associated should also be included in the data packet but shall remain unencrypted so that routing nodes may verify Node N3 315 is authorized to read content having that security label.

Other security policies may be implemented. Because a security policy is applied by routing nodes, they become the most trusted enforcement points for the system. Routing nodes may require authorization at the full range of security labels. However, it is possible for routing nodes to be authorized to operate on a subset of security labels. In this scenario, if the router is not authorized to process the interest request but another router is, the first router may supply a redirection message instructing the node how to select the other router. For example, a redirection message may contain the security label range the target router is authorized for and the node may change its current security level to one that overlaps the range of the other router.

The authorization/access level of each router is assigned by the system administrator. In an example embodiment, routers with stronger security capabilities (e.g., equipped with a Trusted Exec. Environment) should be assigned to a higher access level.

In an example, security labels may be implemented using enhanced privacy identification (EPID) keys where each security level and category has a different EPID group. Data may be signed (or countersigned) with each category key that applies to the data item. Data may be fragmented according to the category or categories that each fragment pertains to. The data item (or fragment) that exists at a particular security level may be countersigned by the EPID key corresponding to that level. This approach removes the need for identifying nodes explicitly using a node key that contains node authorizations. Routing nodes only need to use EPID keys to enforce the security policy effectively.

Named data network (NDN) namespaces use EPID/direct anonymous attestation (DAA) group signing to apply a namespace-centric signature to NDN interest and data packets allowing routers, producers, and consumers within a common namespace to give priority to 'local' content as a strategy for improved quality of service (QoS).

One challenge facing ICN routing is knowing when and how to give preference to "local" over "distant" content, where local refers to an interest group rather than a physical proximity or network topology. Traditional ICN routing nodes use physical proximity (e.g., 4G/5G connectivity range) or network topology as a way to inform routing nodes which packets to prioritize when optimizing for availability as network resources become saturated. However, this approach does not scale well when priority is given to an interest group (e.g., bird watching enthusiasts). Furthermore, routing nodes are susceptible to faked packet headers that may use various tagging or content labeling schemes to inform routing nodes but where payloads are used for other purposes.

Figure 4:
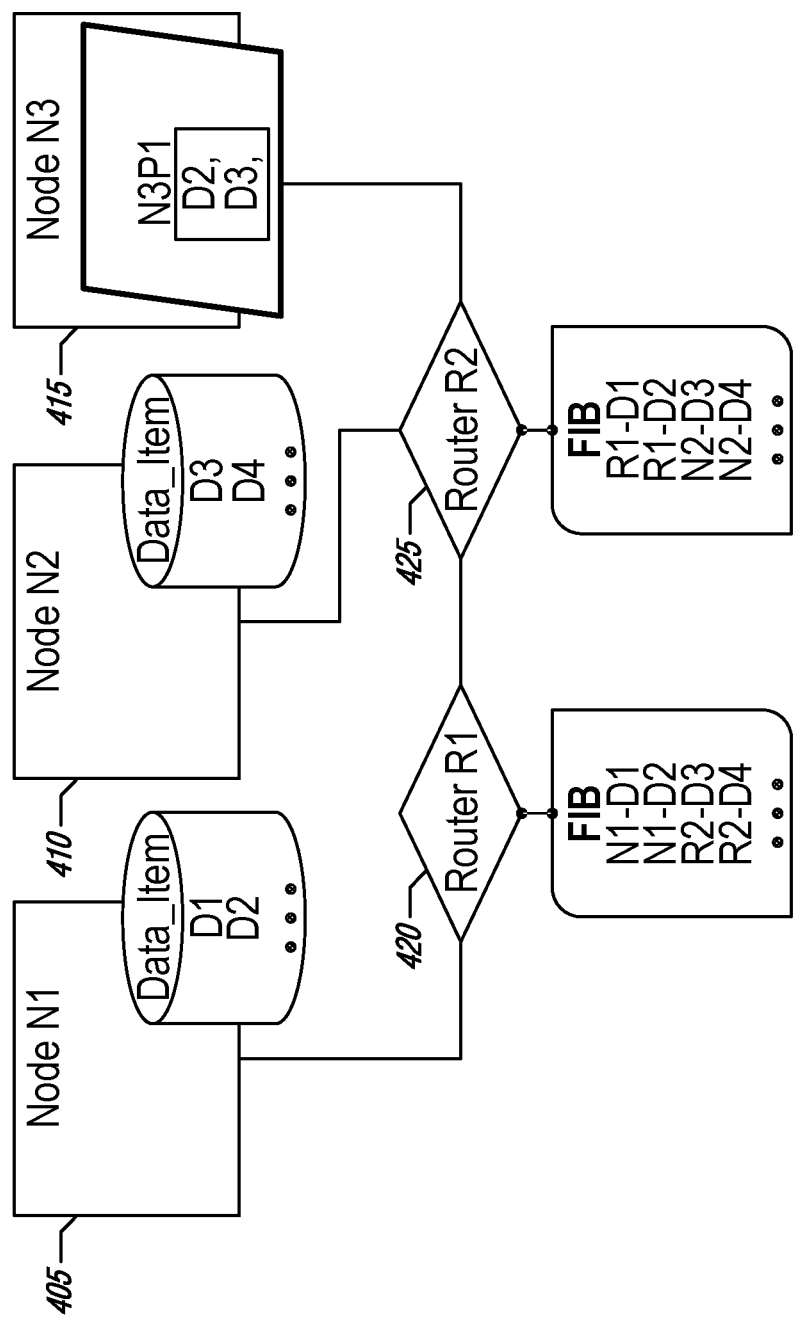
FIG. 4 illustrates an example of ICN forwarding for information-centric network namespace policy-based content delivery, according to an embodiment.

FIG. 4 illustrates an example of ICN forwarding for information-centric network namespace policy-based content delivery, according to an embodiment. FIG. 4 shows an example ICN 400 where Node N3 415 sends an interest packet to Node N1 405 via Router R2 425 and Router R1 420, and Node N2 410 via Router R2 425, to show an interest in data items D2 and D3.

The systems and techniques discussed herein use group semantics that allow cryptographically labeled interest packets and data packets originating from group members. This approach enables: (1) any node in the network to verify the authenticity of a packet as originated by a (legitimate) group member; (2) group-based interest packets; and (3) in-network filtering (e.g., filtering of non-legitimate requests for a content that only certain group members are entitled to request).

Sensitive content belonging to a group, organization or system may be distinguished from other content not belonging to the group and ICN 400 interactions may be restricted to authorized members. This allows the ICN 400 to be used by authorized members for high value content, such as content that is not appropriate for public disclosure.

A group signing scheme is used to create a group key (e.g., EPID, DAA, etc.) that are used by members of a group to sign interest and data packets and may be uniquely identified as from members of the group. In particular, each member may sign ICN 400 payloads such that any group member or non-group member (including routing nodes) may verify the signature as a way to recognize the ICN 400 interest group content. Signed ICN 400 interest and data packets may be easily identified and authenticated to the interest group. Routing nodes may verify/authenticate that the packet originates from the interest group namespace before routing, caching or giving preference to participant nodes for the given namespace/interest group.

An alternative group key generation scheme may follow the Device Identity Composition Engine (DICE) specification guidelines from TRUSTED COMPUTING GROUP® (TCG) for seeding asymmetric key generation using a known seed value. The ICN 400 labels and claims (L1, C1, . . . Cn) etc. may be used to generate a hash value that may be used to generate a group specific seed that further is used to generate a group content key.

A second Unique Device Secret (UDS) value may be used among a group of nodes agreeing to participate in the group where the UDS value is manufactured to be common among the group members. For example, the group UDS value could be burned into FLASH memory or into fuses.

Figure 5:
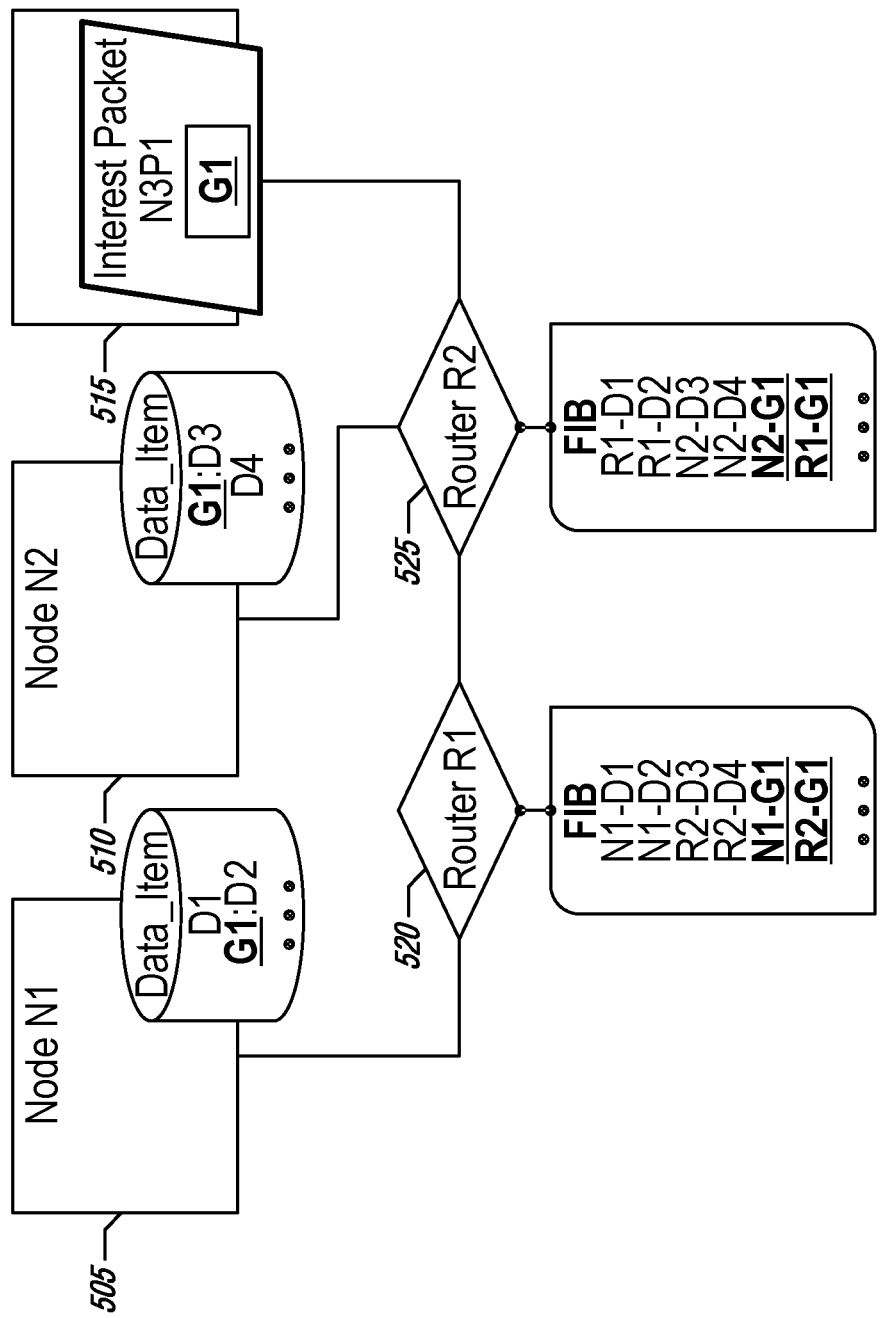
FIG. 5 illustrates an example of modified ICN forwarding for information-centric network namespace policy-based content delivery, according to an embodiment.

FIG. 5 illustrates an example of modified ICN forwarding for information-centric network namespace policy-based content delivery, according to an embodiment. FIG. 5 shows the an ICN 500 where data items are grouped according to a grouping semantic that is defined when the group is formed. Individual ICN 500 data items may (or may not) fit into the grouping semantic. If it does, the group name is associated (e.g., prepended, etc.) with the data item name (e.g., G1:D2). Routes to data items satisfying group G1 semantics are also added to routing tables and data item caches. Node N3 515 may show an interest in everything that satisfies G1 grouping semantics by giving the group name G1 in the interest packet. Router R2 525 identifies Node N2 510 as one containing G1 relevant content and Router R1 520 knowing about other nodes having G1 relevant content. Router R1 520 receives a forwarded interest packet for Node N3 515 and determines Node N1 505 also has G1 relevant data items (e.g., D2).

Figure 6:
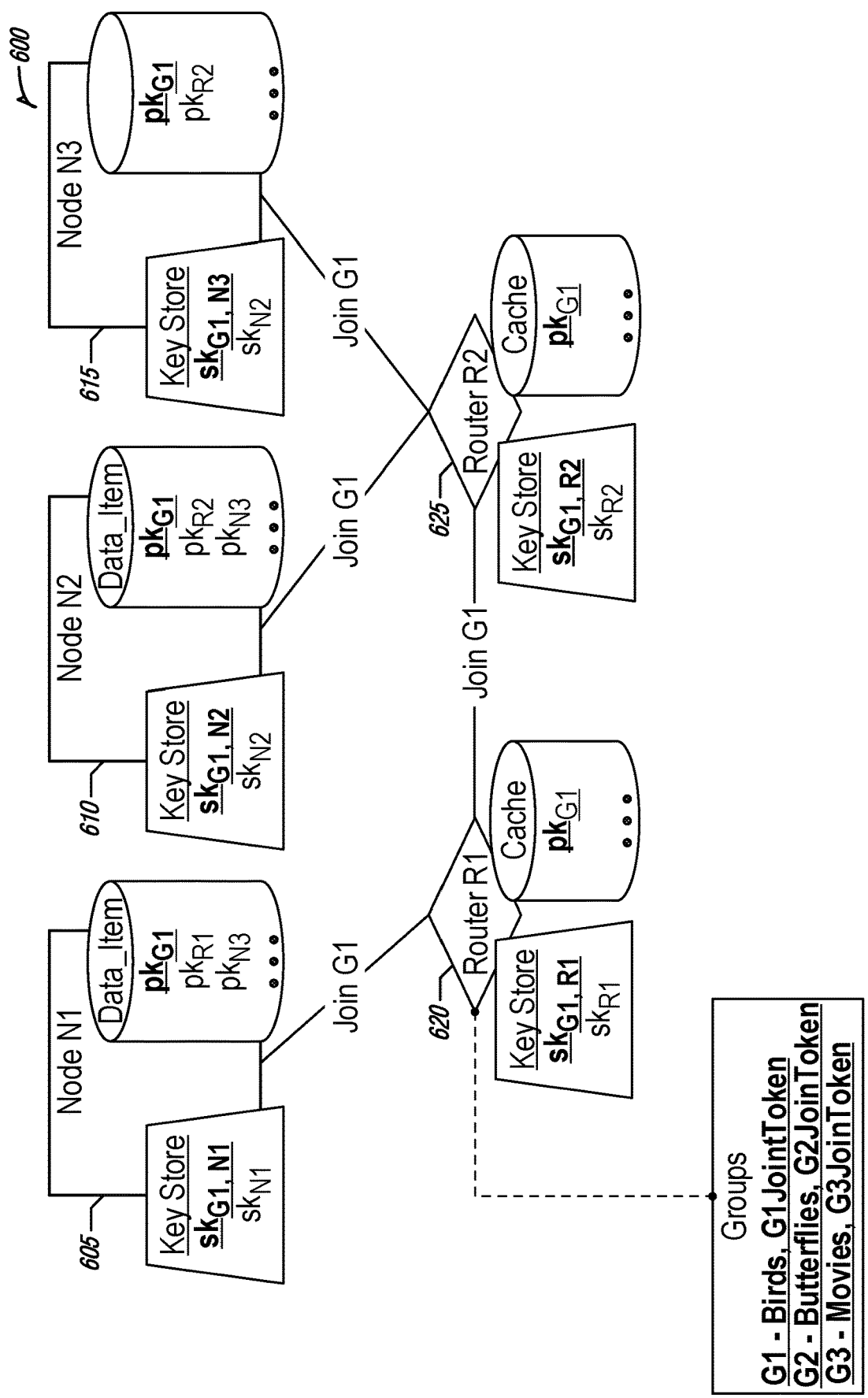
FIG. 6 illustrates an example of a group formation process for information-centric network namespace policy-based content delivery, according to an embodiment.

FIG. 6 illustrates an example of a group formation process for information-centric network namespace policy-based content delivery, according to an embodiment. FIG. 3 shows a method for forming a group over an ICN 600. In this example, Router R1 620 is nominated as the group manager. Any node could be a group manager. Nodes may find group managers by showing interest in group management content. The Group manager (e.g., Router R1 620) forms a group by creating a group name (G1) that defines group semantics (e.g., content related to birds, etc.). It generates token values that facilitate a group join protocol (e.g., EPID, DAA, etc.). Nodes (e.g., Node N1 605, Node N2 610, and Node N3 615) and Routers (e.g., Router R1 620 and Router R2 625) join the group by completing the join protocol which results in the creation of a group private key ($sk_{G1,X}$) that is unique to each node or router X. The group public key $pk_{G1}$ is placed in a public data repository/cache making it available to both group members and non-group members.

After joining a group, a node may express interest for content published by group members. As an example, Node N3 615 may issue an interest packet for content published within Group G1 by signing the interest packet using its private key $sk_{G1,N3}$. Routers receiving the interest packet may verify its signature, authorizing Node N3 615 to retrieve content as a member of group G1. Routing policy is specific to a network owner. For example, a different network owner might have a policy authorizing routing nodes to allow non-group members to show interest in contents published by members of G1. This allows the non-group members to show interest anonymously. Router R1 620 may require router R2 625 to be a member of G1 before forwarding interest packets (anonymous or authenticated). Routers may deliver interest packets under the condition that Node N1 805 and Node N2 810 are members of G1. This may be accomplished by requiring nodes to sign using G1-PrivKey when content is registered with a router before including it in a routing table or cache. Routing nodes may be required by nodes to also be group members by checking that the interest or data packets have a group signature before acceptance. This ensures nodes are not susceptible to attacks on the routing fabric that may be intended to establish side-channels that may reveal sensitive information about the state of a node, operational patterns of node, or potentially cause the node to disclose sensitive data items to an unauthorized entity.

Figure 7:
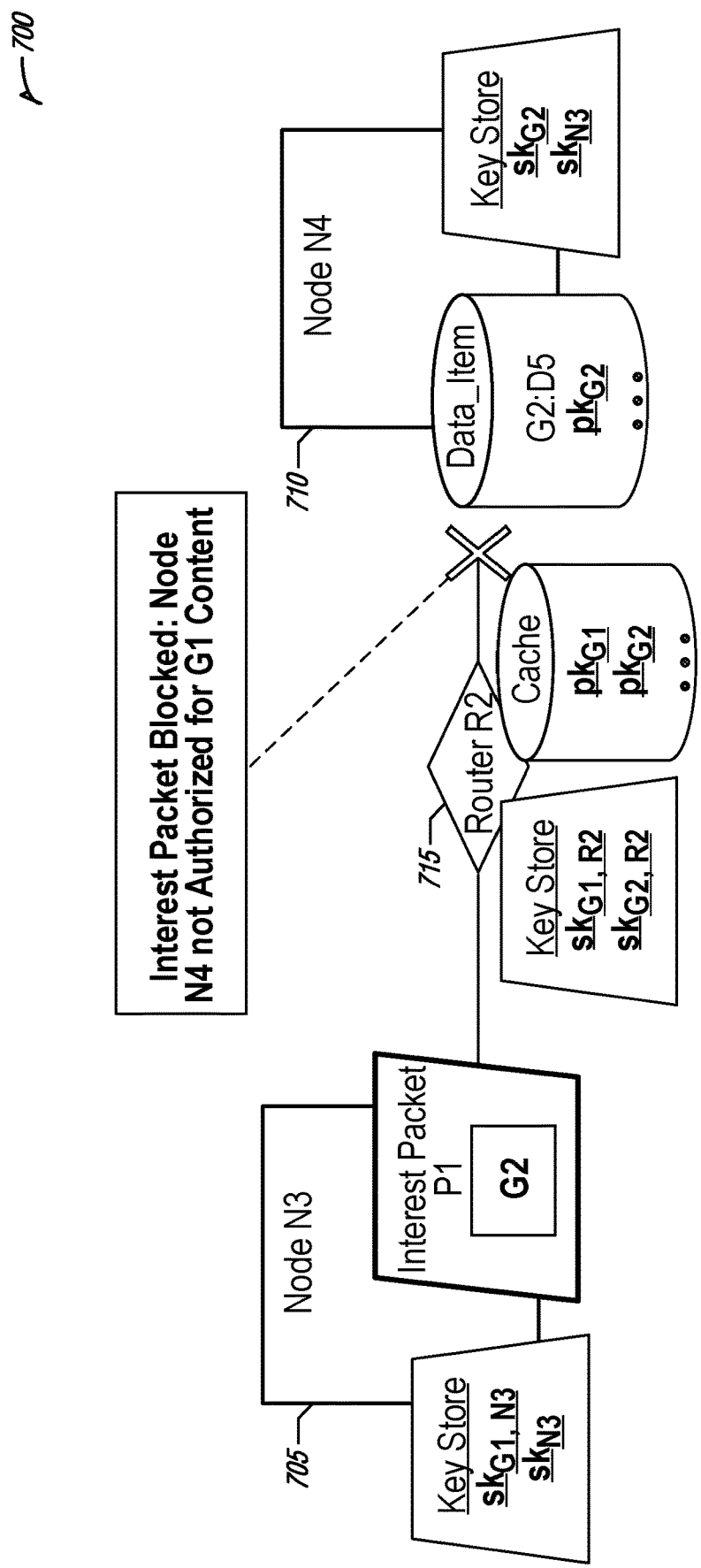
FIG. 7 illustrates an example of group-based interest filtering for information-centric network namespace policy-based content delivery, according to an embodiment.

FIG. 7 illustrates an example of group-based interest filtering for information-centric network namespace policy-based content delivery, according to an embodiment. FIG. 7 shows a scenario 700 where group-based interest filtering is enforced by a router. A node N4 710 may possess data items belonging to group G2 and a node N3 705 may issue an interest packet for G2. However, as node N3 705 cannot authenticate as a member of G2 and Router R2 715 has a policy not to deliver interest packets to nodes unless they are also a member of the group, Router R2 715 will block the interest packet from Node N3 705. Different policies may employ different rules for sharing group affiliated content with non-group members. Both routers and nodes may enforce group policies to achieve the network owner's objectives for content control.

Group keys may be generated for a variety of purposes in addition to the use case described above. Some of these include the following non-limiting examples:

1) Content-based grouping of data—In a content-based system, messages are only delivered to a subscriber if the attributes or content of those messages matches constraints defined by the subscriber. The subscriber is responsible for classifying the messages. Using content group keys, the range of permissible content constraint attributes are defined over the group key. Subscribers specify attributes as a subset of the permissible range. If an attribute is outside the permissible range the publisher may refuse to process a request. Routing nodes optimize network performance by refusing to deliver interest packets that are outside the range.

2) Topic-based grouping of data—In a topic-based system, messages are published to "topics" or named logical channels. Subscribers in a topic-based system will receive all messages published to the topics to which they subscribe, and all subscribers to a topic will receive the same messages. The publisher is responsible for defining the classes of messages to which subscribers may subscribe. Using group keys, the publisher cooperates with the group leader to create group keys that correspond to topics. Interest and data packets may be signed using the group key and routers and end nodes may verify topic signatures before processing the publish/subscribe function. Routing nodes may perform topic signature checking on interest packets to optimize network performance.

3) Operational/role-based grouping—ICNs have several defined roles such as router, producer, consumer, content store, content cache, etc. Group keys may be created corresponding to each role where only the entity possessing that role is allowed to perform the role. For example, a routing node may be authorized to route, but not cache content. Hence, it would be a member of the 'routing' group and not the 'routing+content cache' group. Any node in the ICN may verify role signatures to determine when an ICN entity is authorized to perform the assigned role.

4) QoS/Priority based grouping—ICN quality of service (QoS) may be a value assigned to interest and data packet parameters sections that are normally under the control of the routing infrastructure. However, endpoint consumers and producers need to establish authorization to operate at higher QoS levels—typically this is achieved using a service level agreement (SLA) contract that requires endpoint authentication to edge routers. Using group keys, the SLA contract authorizes access to QoS level group keys. Producer and consumer nodes authenticate to a group leader who defines the QoS levels using the SLA to prove authorization at a particular QoS level and receives an appropriate QoS group key. Consumer nodes sign interest packets with QoS Level key which is verified by routing nodes routing at the QoS level. Producer nodes similarly sign content packets and may counter-sign consumer QoS signature so that content packets are processed at the appropriate QoS level based on a combination of producer and consumer QoS authorizations.

Secure ICNs depend on ICN endpoints and routing nodes having content-specific or namespace specific cryptographic keys. However, keys may become compromised, wear out or expire resulting in various ICN failures and inefficiencies. Consequently, the ICN needs to proactively manage key lifecycles in order to ensure ready/timely access to expected ICN functionality.

Traditional approaches to key management include: 1) Public Key Infrastructure (PKI) that defines certificates and certificate revocation where a verifier may check a certificate revocation list to determine if the certificate is revoked; 2) Kerberos is a symmetric key management system that issues tickets containing expirations. If the expiration is short (1 day) the ticket expires before revocation is needed; 3) OAuth2 family of authorization services issues tokens that describes valid attributes based on whether or not a user has authenticated recently to the authentication server. The approaches described above may be used by an ICN to sign ICN packets. However, operation of these security services is external to the ICN infrastructure.

Each of the traditional approaches to key management has shortcomings when applied to the ICN. PKI revocation depends on all nodes being able to have current revocation lists or depends on a central revocation service that maintains current revocation state. This approach does not scale with ICN networks. Certificate revocation semantics apply to certificates and not keys. It is possible for a key to have multiple certificates. Revocation of one certificate doesn't revoke the other certificates. Kerberos tickets assume keys will become stale quickly which requires re-negotiation and re-sharing of keys which does not scale with ICN networks that may consist of millions of nodes reaching across large geographical distances. OAuth2 tokens are centrally issued and may not require use of cryptographic keys that protect data. ICN networks focus on content protections vs. tokens that focus on user authentication.

Use of the ICN may be the most efficient way to manage key status information. Existing ICNs do not work within the ICN infrastructure to implement key status. Key status information for a key (asymmetric, symmetric) is maintained in a key status file named using the key identifier. Verifiers show interest in keyID in order to find key status files. The ICN is used to deliver the most current revocation, deletion, ownership status—relying upon the caching optimization, sharing and propagation algorithms common to ICNs. Key status is ubiquitous and current.

The systems and techniques discussed herein introduce Cryptographic Key Status in the ICN infrastructure. In ICN a change in status may result when a node determines a key has been compromised, expired or is superseded by another key. Producers and Consumers establish interest in peer keys as a consequence of finding interest in shared data. This interest may trigger interest in key status resulting in nodes and the NDN network performing an aspect of key status management. Key status is used to indicate revocation or deletion and publishing to a named domain.

Figure 8:
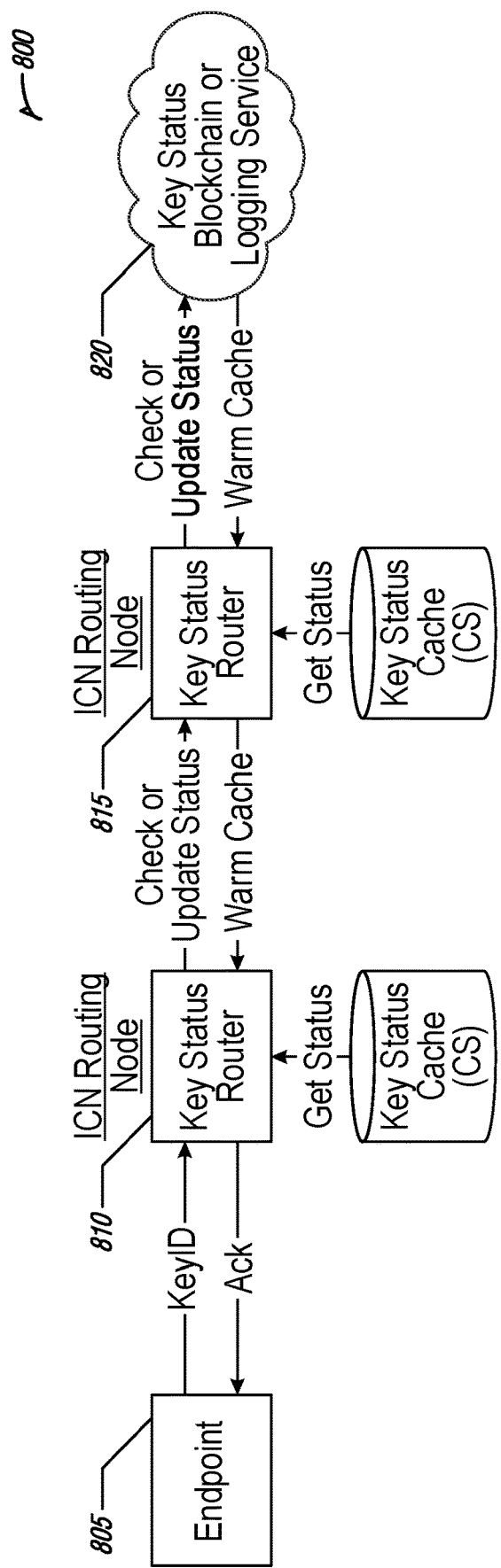
FIG. 8 illustrates an example of a system for cryptographic key status tracking for information-centric network namespace policy-based content delivery, according to an embodiment.

FIG. 8 illustrates an example of a system 800 for cryptographic key status tracking for information-centric network namespace policy-based content delivery, according to an embodiment. An endpoint node 805 may transmit a KeyID (e.g., in an interest packet, etc.) to a first ICN routing node 810 that includes a key status router role. The first ICN routing node 810 may check the key status of the KeyID from the its key status cache and may verify or update the key status and forward the status on to a second ICN routing node 815 the includes the key status router role. The second ICN routing node 815 may check the key status of the KeyID from the its key status cache and may verify or update the key status and forward the status on to a key status blockchain or logging service 820. The key status blockchain or logging service 820 may provide key statuses in a warm cache to the second ICN routing node 815 that may in turn provide the warm cache to the first ICN routing node 810 for storage in their respective key status cache. An acknowledgment is then provided to the endpoint node 805.

Figure 9:
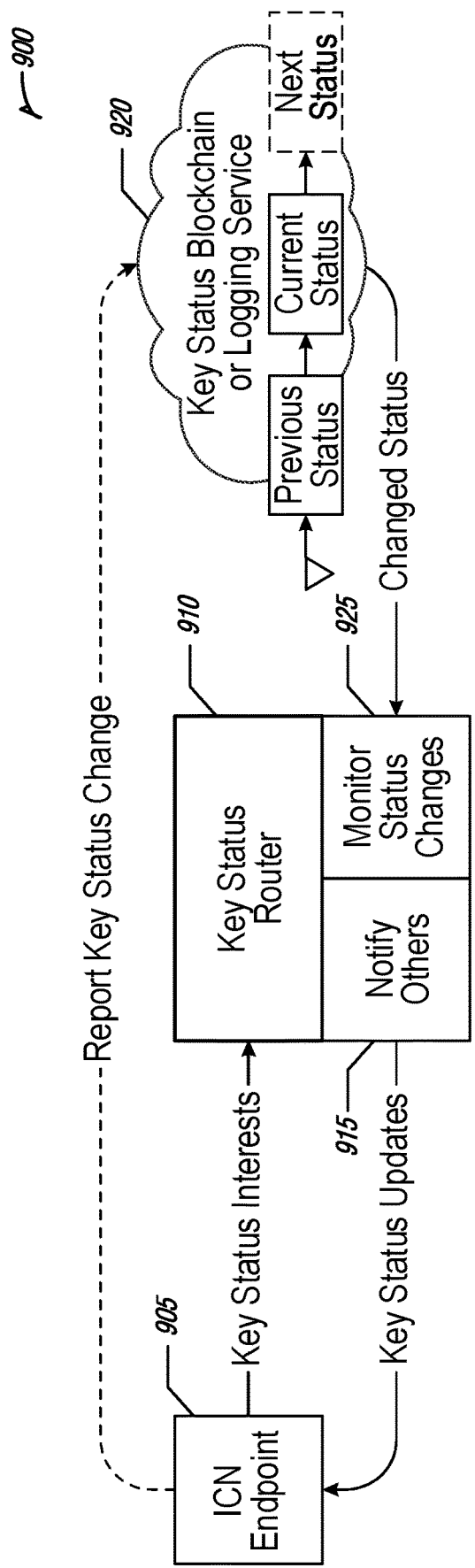
FIG. 9 illustrates an example of a key status change notification process for information-centric network namespace policy-based content delivery, according to an embodiment.

FIG. 9 illustrates an example of a key status change notification process 900 for information-centric network namespace policy-based content delivery, according to an embodiment. An ICN endpoint node 905 may transmit key status interests to a router 910 that includes a key status router role. The ICN endpoint may also report key status changes to a key status blockchain or logging service 920. The key status blockchain or logging service 920 may track key status progression providing a history of previous key status, current status, and any next status. The key status blockchain or logging service 920 may transmit key status changes to a status change monitor 925 of the router 910.

The status monitor may then update cache entries for the key in a key status cache (not shown) of the router 910. The router 910 may then use a notifier 915 to transmit key status updates to other nodes, routers, etc. For example, a key status update may be transmitted from the router 910 to the ICN endpoint node 905. In an example, the key status update may act as an acknowledgement to the ICN endpoint node 905 to verify a key status interest transmitted to the router 910. In another example, the router 910 may transmit the key status updates to another router (not shown) to update a key status cache of the other router allowing the key status updates to propagate through the ICN.

Figure 10:
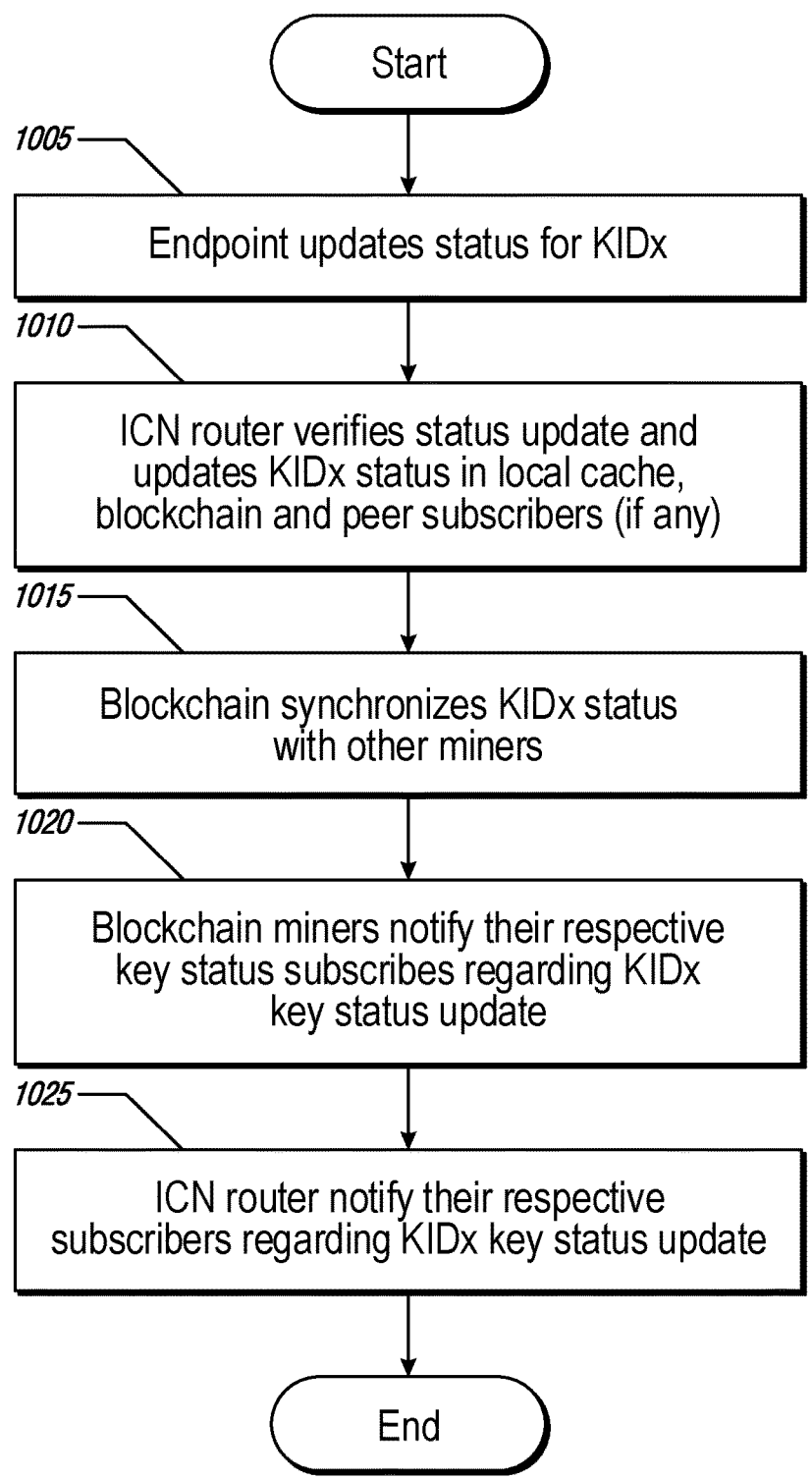
FIG. 10 is a flow diagram of a process for key change status tracking for information-centric network namespace policy-based content delivery, according to an embodiment.

FIG. 10 is a flow diagram of a process 1000 for key change status tracking for information-centric network namespace policy-based content delivery, according to an embodiment. An endpoint may update a status for Key ID X ($KID_x$) (e.g., at operation 1005). The ICN router may verify the status update and may update the status of $KID_x$ in its local cache (e.g., at operation 1010). A blockchain may synchronize the status for $KID_x$ with other miners on the blockchain (e.g., at operation 1015). The blockchain miners may notify their respective key status update subscribers about the key status update for $KID_x$ (e.g., at operation 1020). The ICN router may notify its subscribers about the key status update for $KID_x$ (e.g., at operation 1025). This provides the subscribers of the blockchain miners and the routers with the most up-to-date key status information for a key ID. The wide propagation of the status information provides uniform key status information throughout the ICN and the localization of key status information at the router level reduces latency by providing local key status validation.

Figure 11:
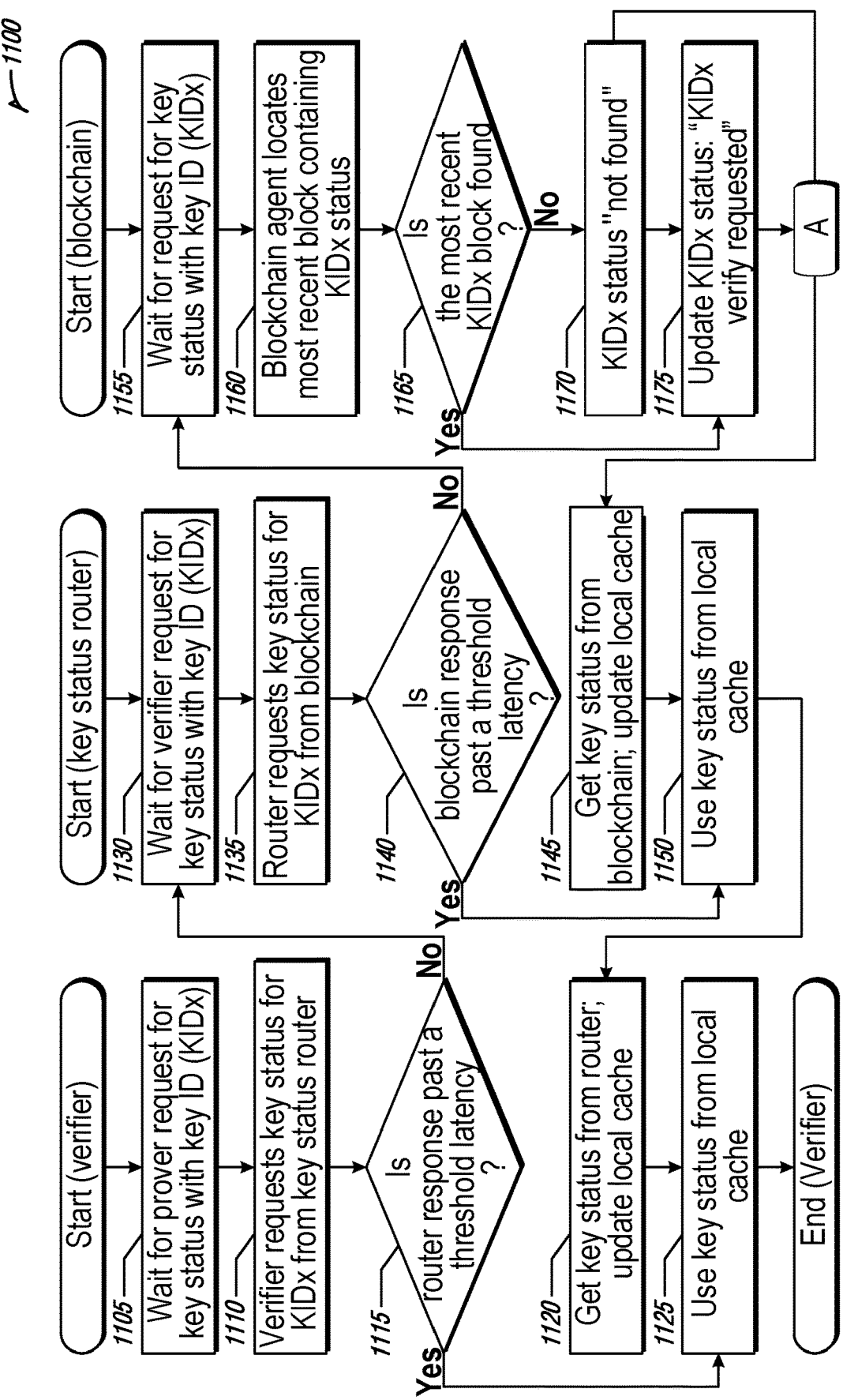
FIG. 11 is a flow diagram of an example of a key status notification and propagation process for information-centric network namespace policy-based content delivery, according to an embodiment.

FIG. 11 is a flow diagram of an example of a key status notification and propagation process 1100 for information-centric network namespace policy-based content delivery, according to an embodiment. A key status verifier may wait for a prover request for a key status with a key ID "$KID_x$" (e.g., at operation 1105). The key status verifier may request a key status for $KID_x$ from a key status router (e.g., nearest router with a key status role, etc.) (e.g., at operation 1110). The key verifier may determine if a response from the key status router is past a threshold latency (e.g., at decision 1115). For example, the key verifier may determine if a timestamp of the latest key status for $KID_x$ included in the response is within an aging threshold. If the key verifier determines the response is within the latency threshold, it receives the key status for $KID_x$ from the key status router and updates its local cache and uses the key status from the local cache (e.g., at operation 1125).

If the key verifier determines that the response from the key status router is past the threshold latency, the key status router waits for a key verifier request for a key status for $KID_x$ (e.g., at operation 1130). The key status router requests a key status for $KID_x$ from a blockchain storing key status information (e.g., at operation 1135). The key status router may determine if a response from the blockchain is past a threshold latency (e.g., at decision 1140). If the key status router determines the response is within the latency threshold, it updates the key status in its local cache for $KID_x$ and uses the key status from the local cache (e.g., at operation 1150). The key verifier then retrieves the key status for $KID_x$ from the key status router, and updates its local cache (e.g., at operation 1125). The key status from the local cache of the key verifier is then used (e.g., at operation 1125).

If the key status router determines that the response from the blockchain is past the threshold latency, the blockchain waits for a key status router request for a key status for $KID_x$ (e.g., at operation 1155). The blockchain agent locates a most recent block including a key status for $KID_x$ (e.g., at operation 1160). The block chain determines if the block found is the most recent block with a status for $KID_x$ (e.g., at decision 1165). If so, the blockchain updates the status for $KID_x$ and returns $KID_x$ the updated status for $KID_x$ (e.g., at operation 1175). The key status router then retrieves the key status for $KID_x$ from the blockchain and updates its local cache (e.g., at operation 1145). Processing then continues at operation 1150 with the status for $KID_x$ being verified.

If the blockchain does not find a block with the most recent status for $KID_x$, the blockchain returns a "not found" status for $KID_x$ (e.g., at operation 1170). The status is then retrieved by the key status router and the cache updated (e.g., at operation 1145). Processing then continues at operation 1150 with the status for $KID_x$ being unverified.

Figure 12:
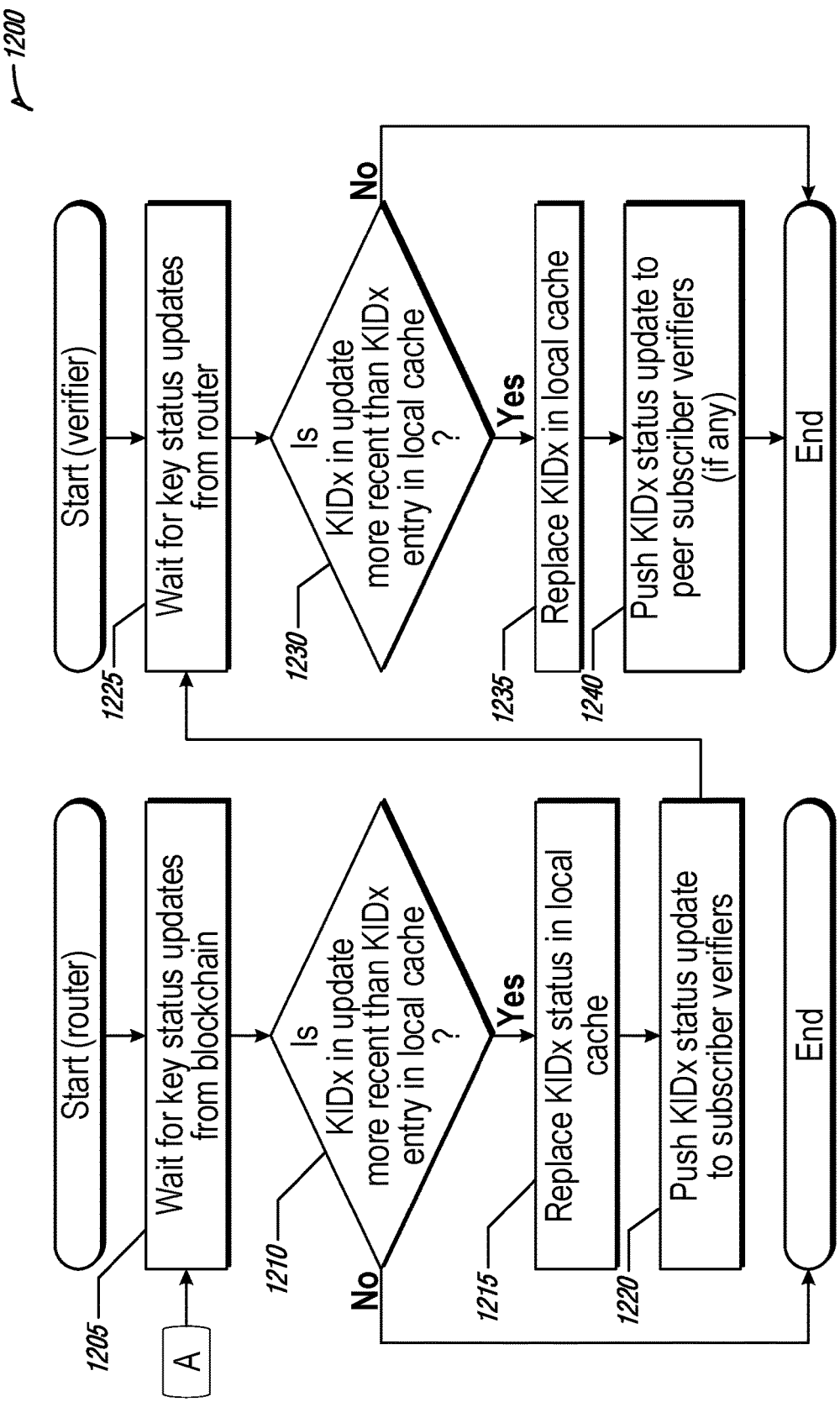
FIG. 12 is a flow diagram of an example of a process for notification of key status update for information-centric network namespace policy-based content delivery, according to an embodiment.

FIG. 12 is a flow diagram of an example of a process 1200 for notification of key status update for information-centric network namespace policy-based content delivery, according to an embodiment. A router node with a key status role may wait for status updates from a blockchain the holds key status information (e.g., at operation 1205). The router may determine if a key status for key $KID_x$ in an update received is more recent than a key status entry in the local cache of the router (e.g., at decision 1210). If the locally cached key status is determined to be more recent than the status included in the update, the process 1200 ends and the router waits for another update (e.g., at operation 1205).

If the locally cached key status is determined to be older than the status included in the update, the key status for $KID_x$ is replaced in the local cache of the router (e.g., at operation 1215). The updated $KID_x$ status is pushed to subscriber verifiers (e.g., at operation 1220). A subscribed verifier may wait for key status updates from the router (e.g., at operation 1225). The subscribed verifier may determine if a key status for key $KID_x$ in an update received is more recent than a key status entry in the local cache of the subscribed verifier (e.g., at decision 1230). If the locally cached key status is determined to be more recent than the status included in the update, the process 1200 ends and the subscribed verifier waits for another update (e.g., at operation 1225).

If the locally cached key status is determined to be older than the status included in the update, the key status for $KID_x$ is replaced in the local cache of the subscribed verifier (e.g., at operation 1235). The updated $KID_x$ status is pushed to peer subscriber verifiers (e.g., at operation 1240). Thus, the latest key updates for each key in the blockchain are propagated through routers to subscriber nodes and their subscribed peers.

Figure 13:
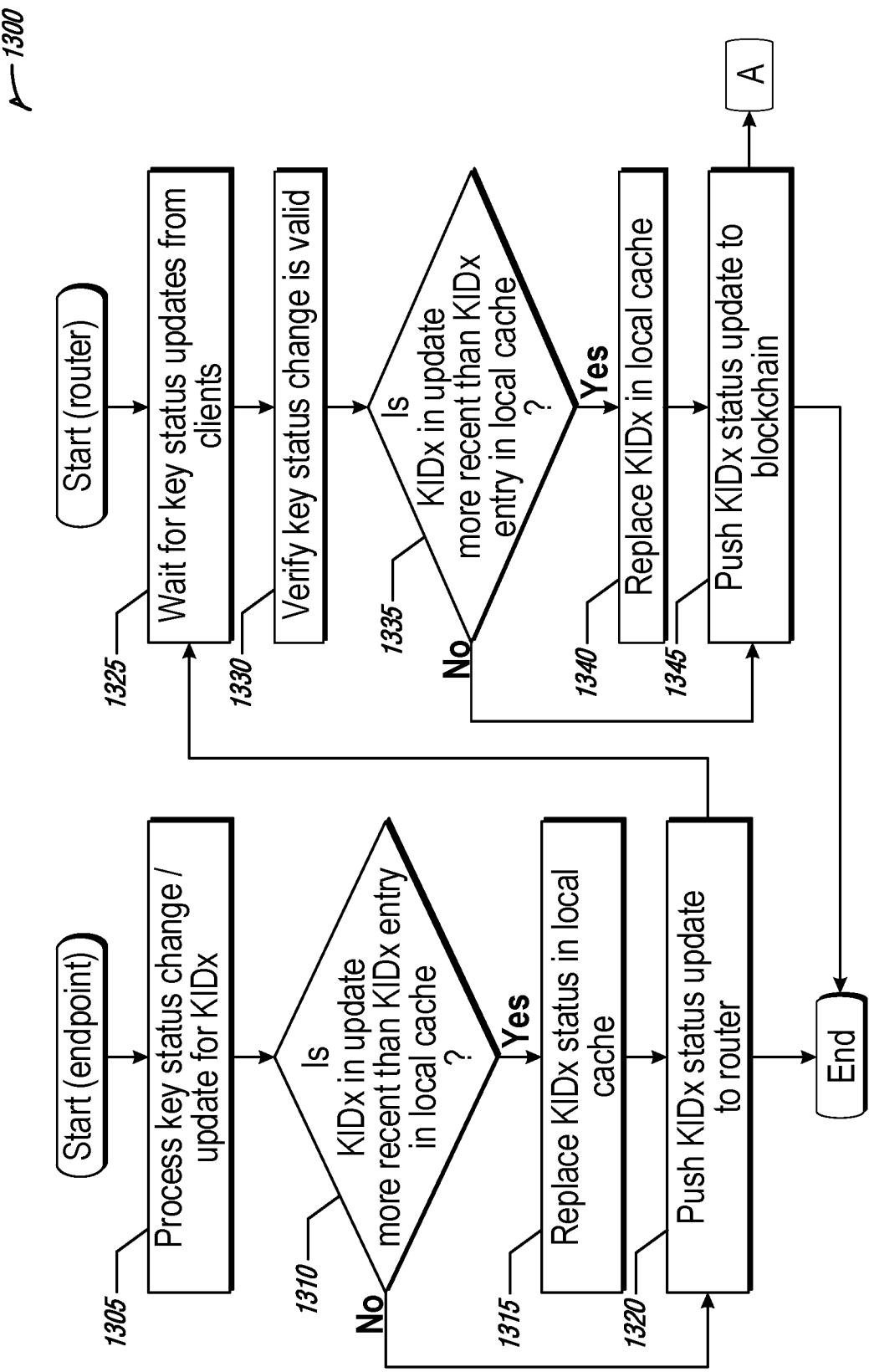
FIG. 13 is a flow diagram of an example of a process for pushing a key status update for information-centric network namespace policy-based content delivery, according to an embodiment.

FIG. 13 is a flow diagram of an example of a process 1300 for pushing a key status update for information-centric network namespace policy-based content delivery, according to an embodiment. An endpoint node may process a key status update or change for key $KID_x$ (e.g., at operation 1305). The endpoint may determine if a key status for key $KID_x$ in an update received in more recent than a key status entry in the local cache of the endpoint (e.g., at decision 1310).

If the locally cached key status is determined to be older than the status included in the update, the key status for $KID_x$ is replaced in the local cache of the endpoint (e.g., at operation 1315). The updated $KID_x$ status is pushed to a router node that includes a key status update role (e.g., at operation 1320). If the locally cached key status is determined to be more recent than the status included in the update, the process 1300 continues at operation 1320.

The router may wait for key status updates from clients (e.g., the endpoint) (e.g., at operation 1325). The router may verify in the key status change is valid (e.g., at operation 1330). The router may determine if a key status for key $KID_x$ in an update received is more recent than a key status entry in the local cache of the router (e.g., at decision 1335). If the locally cached key status is determined to be older than the status included in the update, the key status for $KID_x$ is replaced in the local cache of the router (e.g., at operation 1340). The updated $KID_x$ status is pushed to a blockchain storing key status information (e.g., at operation 1345). If the locally cached key status is determined to be more recent than the status included in the update, the process 1300 continues at operation 1345. Thus, the latest key updates for each key updated by an endpoint node are propagated through routers to the blockchain to ensure there is a current centralized record of key status information.

In an example, trusted ICNs may depend on Trusted Execution Environments (TEE) to provide a more secure endpoint environment for consuming and manipulating content. However, even if content is protected with encryption keys, there is no guarantee that the keys are protected by a TEE. Furthermore, even if the ICN had set a global standard requiring key protection, there is no expectation that decrypted data is protected by a TEE.

Additionally, if ICN data is cryptographically protected end-to-end, the ICN may not function properly unless some of the content metadata is shared with the routing layers (e.g., forwarding information base (FIB), PIT, etc.). But doing so may compromise security goals. To address this problem, the ICN routing nodes also use TEE technology that ensures the sensitive metadata portion of interest and data packets are protected with strength at least equal to that applied to meet end-to-end protection requirements.

Traditional solutions for enabling trust may include: 1) TCG trusted platform module (TPM) and TPM-based attestation; 2) World Wide Web Consortium (W3C®) defines verifiable claims and Fast Identity Online (FIDO) Alliance attestation; and 3) Google key store technology defines verifiable keys. However, existing solutions do not integrate attestation claims with content (e.g., data) and do not utilize the ICN effectively to manage content flow and access based on an expectation of attested data.

Increased security in ICN processing of data and interest packets may be recognized through use of TEE such as hardware-enabled secure memory enclaves. Access to packets are protected using the TEE and nodes are able to assess whether a potential node is using the TEE properly. ICN data may be deemed more trustworthy because ICN participant nodes may be assured that ICN data is protected on each node that may have interest or reason to access the data.

The systems and techniques discussed herein allow producers and consumers to use the ICN to negotiate a common set of TEE claims to be satisfied before producer data is authorized for consumption by consumer(s).

Figure 14:
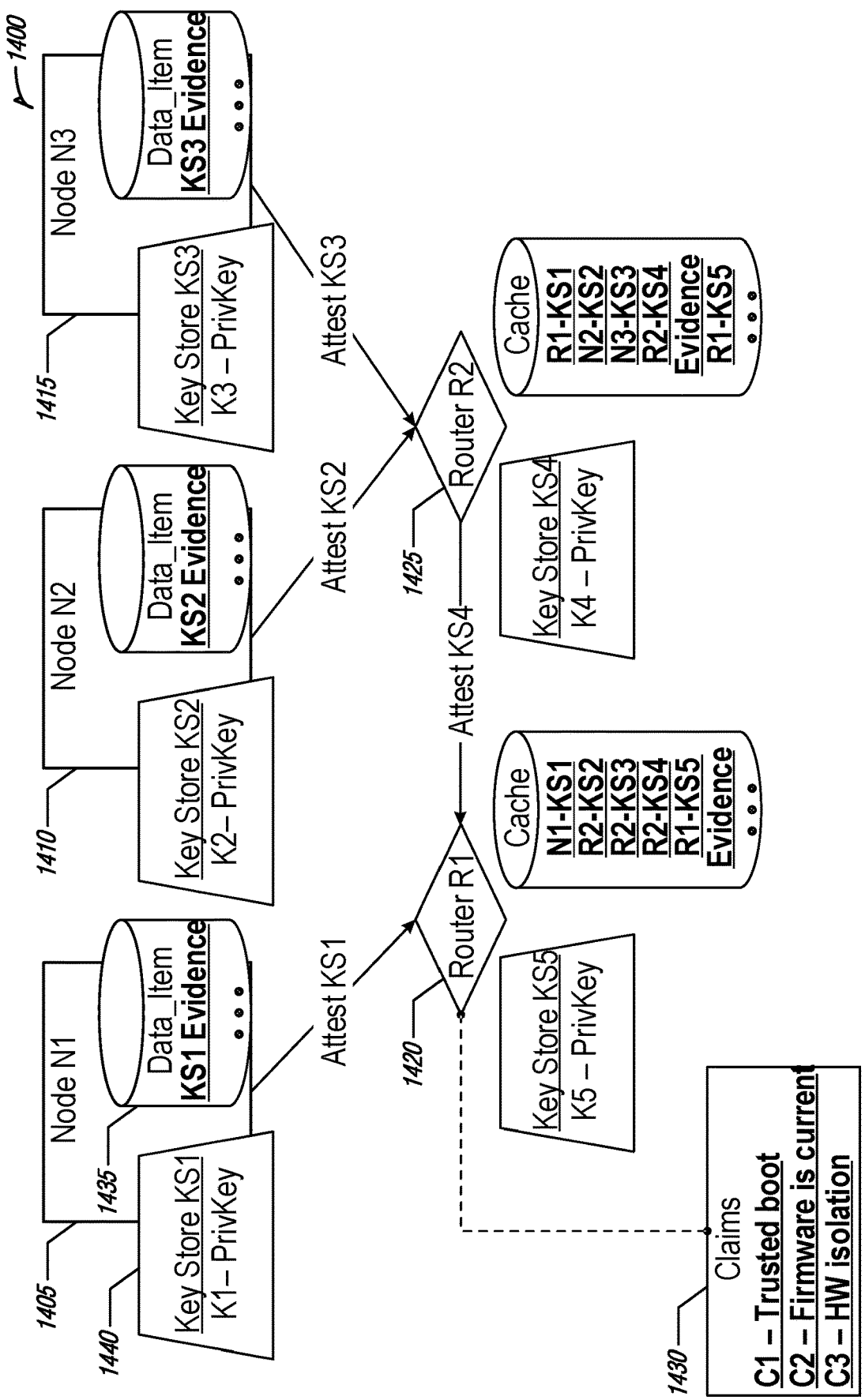
FIG. 14 illustrates an example of a system for key storage and evidence publication of claims for information-centric network namespace policy-based content delivery, according to an embodiment.

FIG. 14 illustrates an example of a system 1400 for key storage and evidence publication of claims for information-centric network namespace policy-based content delivery, according to an embodiment. shows an ICN network where nodes (e.g., node N1 1405, node N2 1410, and node N3 1415) associate metadata with data. Security level metadata may also be associated with data. Keys may be associated with groups and security labels to protect integrity and confidentiality of interest packets, data packets, and other content. Routing nodes (e.g., router R1 1420 and router R2 1425) help enforce a uniform security policy. Trust in the keys is based on the use of TEE to protect private keys from attackers and potential misuse. Trusted computing techniques may be used to express trustworthiness determinations about how keys and data are protected on nodes and routers.

In FIG. 14, the key storage technology (e.g., KeyStore, etc.) has corresponding verifiable (e.g., attestable) claims 1430. These claims 1430 may be asserted as evidence to routing node R1 1420 (or any node tasked with verifying attestation evidence). A node may show interest in another node's evidence which may be stored in its data repository resource such as data repository 1435 for node N1 1405. For example, node N3 1415 may send an interest packet to node N1 1405 for KS1 Evidence. Node N1 1405 may respond by attesting to the claims it possesses. This may use an attestation key K1 (e.g., from a key store 1440 of node N1 1405) that is known to possess one or more claims 1430 (e.g., C1-C3) or it may explicitly include claims data that are signed by other well-known claims providers.

Figure 15:
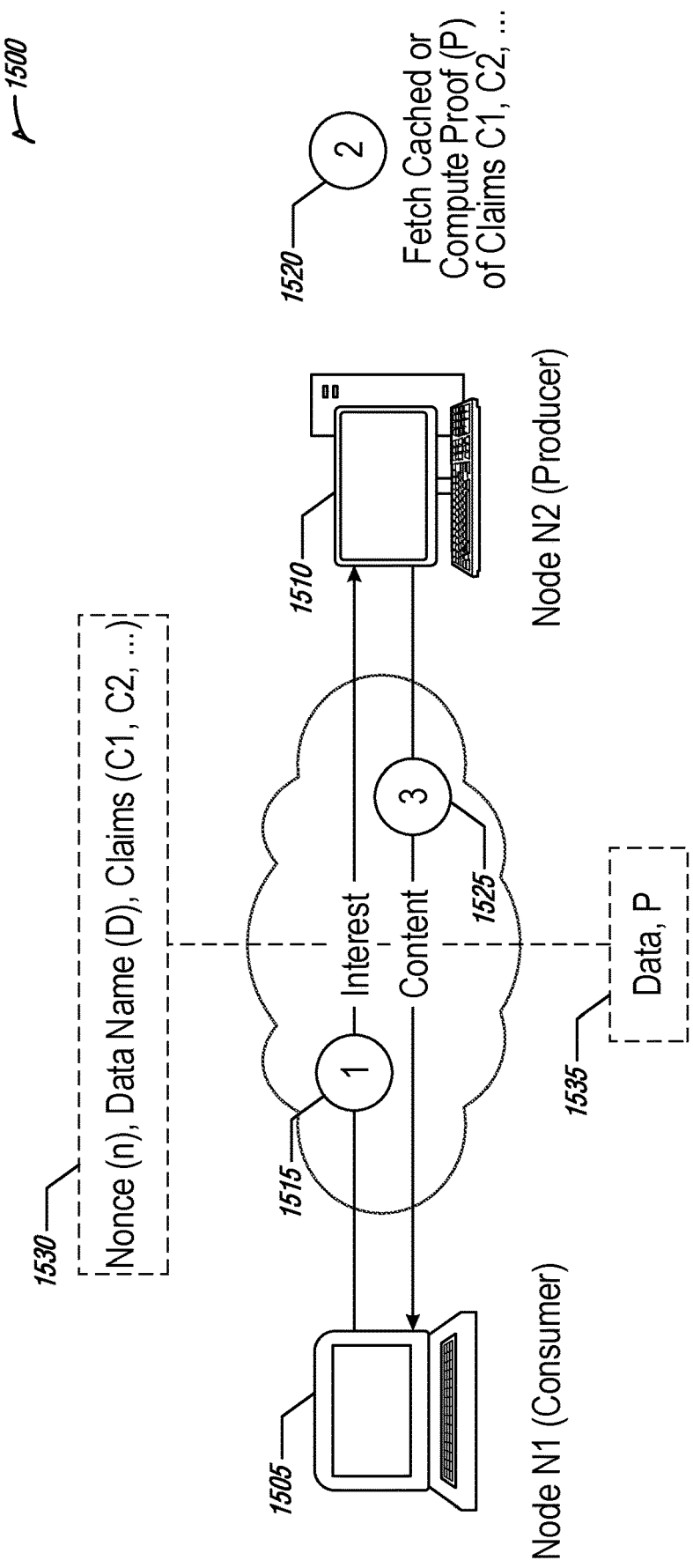
FIG. 15 illustrates an example of an attested data request process for information-centric network namespace policy-based content delivery, according to an embodiment.

FIG. 15 illustrates an example of an attested data request process 1500 for information-centric network namespace policy-based content delivery, according to an embodiment. FIG. 15 shows an example of attested data request involving two nodes, node N1 1505 and node N2 1510. Node N1 1505 issues 1515 an interest packet 1535 for named data D 1530, that specifies a set of claims C1, C2, . . . , and a nonce n that guarantees freshness. In an example, if node N1 1505 is interested in all the available claims from node N2 1510, node N1 1505 may use a wildcard for example, C*. The interest packet 1535 instructs node N2 1510 to include a proof P 1520 of the claims of interest in the data packet that includes the data item with name D. The proof P 1520 is computed by an attestation procedure on the claims and includes the nonce n as well as the data. In an example, P 1520 is signed by an authoritative key on the specific set of claims. In an example embodiment, the signing key may be a manufacturer's key indicating which security-relevant manufacturing processes were used in producing the node. In another example embodiment, P 1520 may be signed by an attestation key such as a TCG Device Identifier Composition Engine (DICE) key or a TCG TPM Initial Attestation Key, by an Institute of Electrical and Electronics Engineers (IEEE) 802.1AR Device Identity key, etc.

Using the procedure above, node N2 1510 asserts 1525 the data is protected according to the protection semantics contained in the claims. The above mechanism may be used by a node to simply verify trust properties of other nodes. in this case, a node may issue an interest for a node's key store (KS*) as the item of interest. In this case, only the attested evidence (P) 1520 is returned.

In another embodiment, an intermediate router may perform the above function on behalf of the network allowing the results to be cached in its content store. Subsequent requests by other routers or nodes will fetch the cached copy. In this scenario, the Router may use a time stamp nonce where the time since last attestation request is included in the data packet response. This allows the receiver to check if the time since the last attestation check has been too great and, for example, poses additional risk.

In another embodiment, the consumer may insert trust claims in the interest packet header. Router caches may verify these claims as part of the interest matching procedure so that the cached data packet will be served to the consumer only if verified and "sufficient" according to the access policy associated with the requested data.

Figure 16:
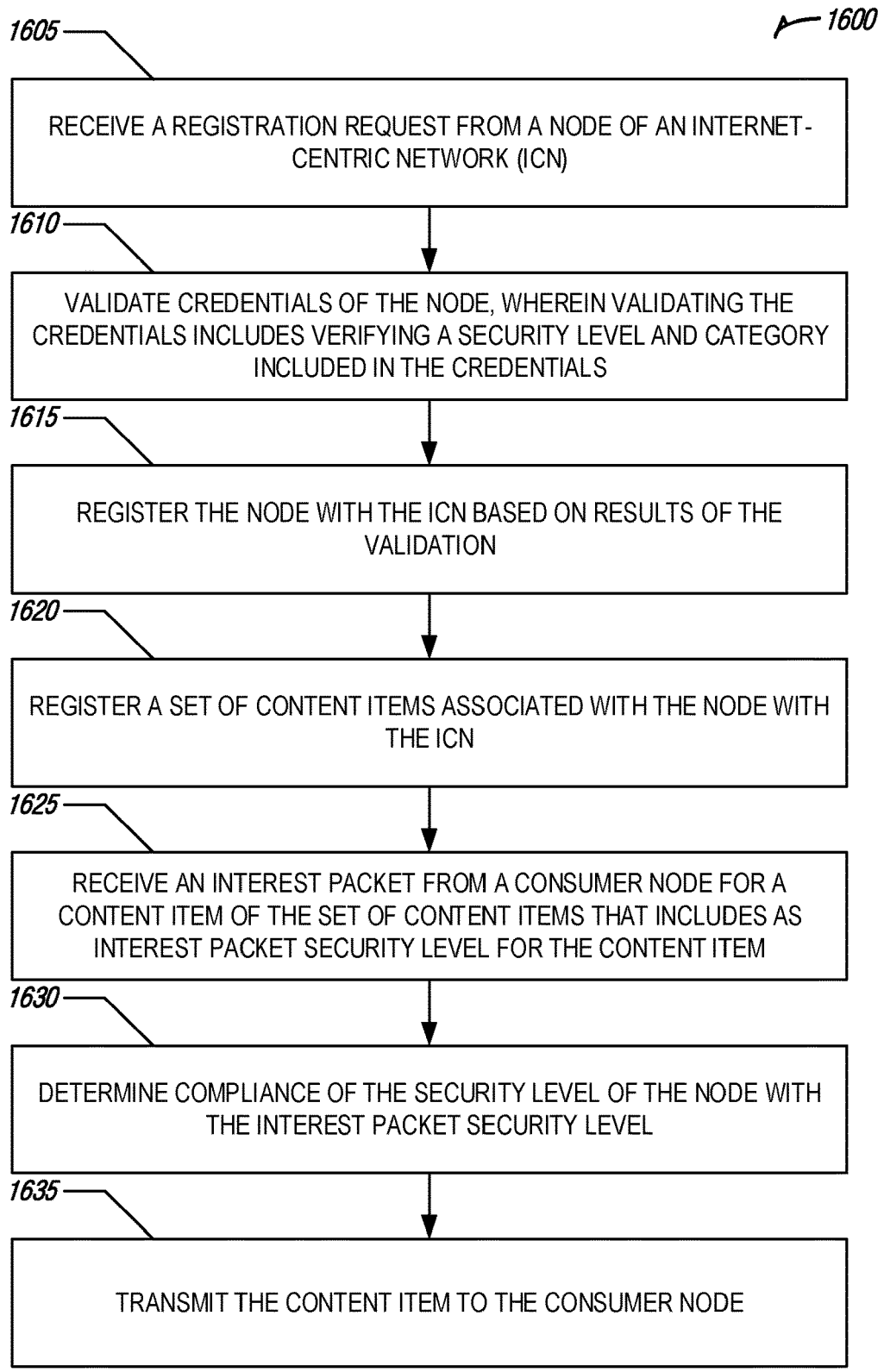
FIG. 16 is a flow diagram of an example of a method for information-centric network namespace policy-based content delivery, according to an embodiment.

FIG. 16 is a flow diagram of an example of a method 1600 for information-centric network namespace policy-based content delivery, according to an embodiment. The method 1600 may provide features described in FIGS. 1-15.

A registration request may be received from a node on an information-centric network (ICN) (e.g., at operation 1605).

Credentials of the node may be verified (e.g., at operation 1610). In an example, the validation of the credentials may include verification of a security level and category included in the credentials.

The node may be registered with the ICN based on results of the validation (e.g., at operation 1615). In an example, the node is registered by a registration authority. In an example, the registration authority is a role assigned to a router node.

A set of content items associated with the node may be registered with the ICN (e.g., at operation 1620). In an example, the set of content items are included in an ICN routing table and ICN cache upon registration with the ICN.

An interest packet may be received from a consumer node for a content item of the set of content items that includes an interest packet security level for the content item (e.g., at operation 1625).

Compliance may be determined of the security level of the node with the interest packet security level (e.g., at operation 1630).

The content item may be transmitted to the consumer node (e.g., at operation 1635). In an example, the content item is transmitted to the consumer node in a data packet that includes a data packet security level that allows the consumer node to verify the security level upon receipt of the data packet.

In an example, it may be determined that the interest packet has been signed with a group key. It may be identified that the node is a member of a group associated with the group key. A group signature included in the interest packet may be validated and, upon validation of the group signature, the content item may be transmitted to the consumer node.

In an example, the content item may be encapsulated in a data packet. The data packet may be signed using the group key and the data packet may be transmitted to the consumer node. In an example, a group signature included in the data packet may be used by the consumer node to validate the authenticity of the data packet. In an example, it may be determined that the node is not a member of the group associated with the group key and transmission of the content to the consumer may be prevented. In an example, the interest packet may be transmitted to a second node that is a member of the group to facilitate transmission of the content item to the consumer node.

In an example, a key status blockchain may be maintained for nodes on the ICN. A key status may be determined for a key associated with the consumer node and the content may be transmitted to the consumer node based upon validation of the key status. In an example, a key status update may be received from the consumer node for the key. The key status update may be validated. The key status update may be cached in a local key status cache of the node and the key status update may be synchronized to other nodes of the ICN. In an example, the key status update may be synchronized to the other nodes of the ICN by transmission of the key status update to miner nodes on the ICN, transmission of the key status update from the miner nodes to respective key status update subscribers of the miner nodes, and transmission of the key status update from router nodes to respective key status update subscribers of the router nodes. In an example, the key status update is validated against a record for the key in the key status blockchain.

In an example, a set of trusted execution environment-based attestation claims and a nonce may be identified in the interest packet. A data packet may be generated including a proof based on the set of trusted execution environment-based attestation claims, the nonce, and the content item and the content item may be transmitted to the consumer node in the data packet. In an example, the interest packet is signed by a key stored in a key store contained maintained in a trusted execution environment. In an example, the interest packet is attested by an attestation node executing on the ICN. In an example, the attestation node is secured by trusted execution environment. In an example, the attestation node executes as a role on a router node operating on the ICN. In an example, the key is a key generated by a manufacturer of the consumer node.

Figure 17:
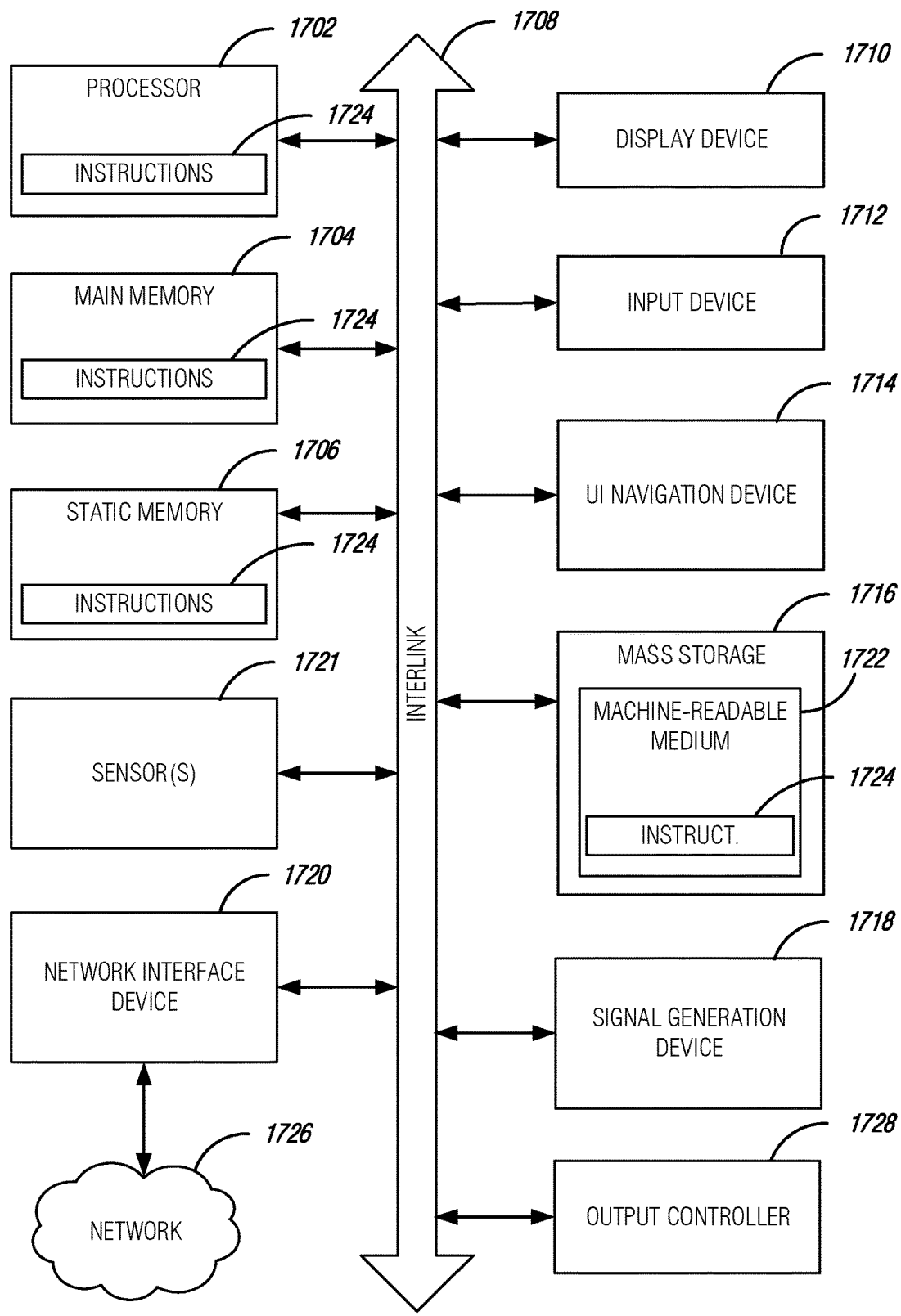
FIG. 17 is a block diagram illustrating an example of a machine upon which one or more embodiments may be implemented.

FIG. 17 illustrates a block diagram of an example machine 1700 upon which any one or more of the techniques (e.g., methodologies) discussed herein may perform. In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environment. The machine 1700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a display unit 1710, an alphanumeric input device 1712 (e.g., a keyboard), and a user interface (UI) navigation device 1714 (e.g., a mouse). In an example, the display unit 1710, input device 1712 and UI navigation device 1714 may be a touch screen display. The machine 1700 may additionally include a storage device (e.g., drive unit) 1716, a signal generation device 1718 (e.g., a speaker), a network interface device 1720, and one or more sensors 1721, such as a global positioning system (GPS) sensor, compass, accelerometer, or other sensors. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the storage device 1716 may constitute machine readable media.

While the machine readable medium 1722 is illustrated as a single medium, the term "machine readable medium" may include a single medium or multiple media (e.g., a centralized or distributed database, and/or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1724 may further be transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1700, and includes digital or analog communications signals or other intangible medium to facilitate communication of such software.

Additional Notes & Examples

Example 1 is a system for information-centric network namespace policy-based content delivery, the system comprising: at least one processor; and memory including instructions that, when executed by the at least one processor, cause the at least one processor to perform operations to: receive a registration request from a node on an information-centric network (ICN); validate credentials of the node, wherein validation of the credentials includes, verification of a security level and a category included in the credentials; register the node with the ICN based on results of the validation; register a set of content items associated with the node with the ICN; receive an interest packet from a consumer node for a content item of the set of content items that includes an interest packet security level for the content item; determine compliance of the security level of the node with the interest packet security level; and transmit, responsive to the compliance determination, the content item to the consumer node.

In Example 2, the subject matter of Example 1 includes, wherein the node is registered by a registration authority.

In Example 3, the subject matter of Example 2 includes, wherein the registration authority is a role assigned to a router node.

In Example 4, the subject matter of Examples 1-3 includes, wherein the content item is transmitted to the consumer node in a data packet that includes a data packet security level that allows the consumer node to verify the security level upon receipt of the data packet.

In Example 5, the subject matter of Examples 1-4 includes, wherein the set of content items are included in an ICN routing table and ICN cache upon registration with the ICN.

In Example 6, the subject matter of Examples 1-5 includes, instructions that cause the at least one processor to: determine that the interest packet has been signed with a group key; identify that the node is a member of a group associated with the group key; validate a group signature included in the interest packet; and transmit, upon validation of the group signature, the content item to the consumer node.

In Example 7, the subject matter of Example 6 includes, instructions that cause the at least one processor to: encapsulate the content item in a data packet; sign the data packet with the group key; and transmit the data packet to the consumer node, wherein a group signature included in the data packet is used by the consumer node to validate the authenticity of the data packet.

In Example 8, the subject matter of Examples 6-7 includes, instructions that cause the at least one processor to: determine that the node is not a member of the group associated with the group key; and prevent transmission of the content item to the consumer node.

In Example 9, the subject matter of Example 8 includes, instructions that cause the at least one processor to transmit the interest packet to a second node that is member of the group to facilitate transmission of the content item to the consumer node.

In Example 10, the subject matter of Examples 1-9 includes, instructions that cause the at least one processor to: maintain a key status blockchain for nodes on the ICN; validate a key status for a key associated with the consumer node; and transmit the content to the consumer node based upon the validation of the key status.

In Example 11, the subject matter of Example 10 includes, instructions that cause the at least one processor to: receive a key status update from the consumer node for the key; validate the key status update; cache the key status update in a local key status cache of the node; and synchronize the key status update to other nodes of the ICN.

In Example 12, the subject matter of Example 11 includes, wherein the instructions to synchronize the key status update further comprises instructions that cause the at least one processor to: transmit the key status update to miner nodes on the ICN; transmit the key status update from the miner nodes to respective key status update subscribers of the miner nodes; and transmit the key status update from router nodes to respective key status update subscribers of the router nodes.

In Example 13, the subject matter of Examples 11-12 includes, wherein the key status update is validated against a record for the key in the key status blockchain.

In Example 14, the subject matter of Examples 1-13 includes, instructions that cause the at least one processor to: identify a set of trusted execution environment-based attestation claims and a nonce in the interest packet; and generate a data packet including a proof based on the set of trusted execution environment-based attestation claims, the nonce, and the content item, wherein transmission of the content item to the consumer node includes transmission of the data packet to the consumer node.

In Example 15, the subject matter of Example 14 includes, wherein the interest packet is signed by a key stored in a key store maintained in a trusted execution environment.

In Example 16, the subject matter of Example 15 includes, wherein the interest packet is attested by an attestation node that executes on the ICN, wherein the attestation node is secured by a trusted execution environment.

In Example 17, the subject matter of Example 16 includes, wherein the attestation node executes as a role on a router node that operates on the ICN.

In Example 18, the subject matter of Examples 15-17 includes, wherein the key is a key generated by a manufacturer of the consumer node.

Example 19 is at least one non-transitory machine readable medium including instructions for information-centric network namespace policy-based content delivery that, when executed by at least one processor, cause the at least one processor to perform operations to: receive a registration request from a node on an information-centric network (ICN); validate credentials of the node, wherein validation of the credentials includes, verification of a security level and a category included in the credentials; register the node with the ICN based on results of the validation; register a set of content items associated with the node with the ICN; receive an interest packet from a consumer node for a content item of the set of content items that includes an interest packet security level for the content item; determine compliance of the security level of the node with the interest packet security level; and transmit, responsive to the compliance determination, the content item to the consumer node.

In Example 20, the subject matter of Example 19 includes, wherein the node is registered by a registration authority.

In Example 21, the subject matter of Example 20 includes, wherein the registration authority is a role assigned to a router node.

In Example 22, the subject matter of Examples 19-21 includes, wherein the content item is transmitted to the consumer node in a data packet that includes a data packet security level that allows the consumer node to verify the security level upon receipt of the data packet.

In Example 23, the subject matter of Examples 19-22 includes, wherein the set of content items are included in an ICN routing table and ICN cache upon registration with the ICN.

In Example 24, the subject matter of Examples 19-23 includes, instructions that cause the at least one processor to: determine that the interest packet has been signed with a group key; identify that the node is a member of a group associated with the group key; validate a group signature included in the interest packet; and transmit, upon validation of the group signature, the content item to the consumer node.

In Example 25, the subject matter of Example 24 includes, instructions that cause the at least one processor to: encapsulate the content item in a data packet; sign the data packet with the group key; and transmit the data packet to the consumer node, wherein a group signature included in the data packet is used by the consumer node to validate the authenticity of the data packet.

In Example 26, the subject matter of Examples 24-25 includes, instructions that cause the at least one processor to: determine that the node is not a member of the group associated with the group key; and prevent transmission of the content item to the consumer node.

In Example 27, the subject matter of Example 26 includes, instructions that cause the at least one processor to transmit the interest packet to a second node that is member of the group to facilitate transmission of the content item to the consumer node.

In Example 28, the subject matter of Examples 19-27 includes, instructions that cause the at least one processor to: maintain a key status blockchain for nodes on the ICN; validate a key status for a key associated with the consumer node; and transmit the content to the consumer node based upon the validation of the key status.

In Example 29, the subject matter of Example 28 includes, instructions that cause the at least one processor to: receive a key status update from the consumer node for the key; validate the key status update; cache the key status update in a local key status cache of the node; and synchronize the key status update to other nodes of the ICN.

In Example 30, the subject matter of Example 29 includes, wherein the instructions to synchronize the key status update further comprises instructions that cause the at least one processor to: transmit the key status update to miner nodes on the ICN; transmit the key status update from the miner nodes to respective key status update subscribers of the miner nodes; and transmit the key status update from router nodes to respective key status update subscribers of the router nodes.

In Example 31, the subject matter of Examples 29-30 includes, wherein the key status update is validated against a record for the key in the key status blockchain.

In Example 32, the subject matter of Examples 19-31 includes, instructions that cause the at least one processor to: identify a set of trusted execution environment-based attestation claims and a nonce in the interest packet; and generate a data packet including a proof based on the set of trusted execution environment-based attestation claims, the nonce, and the content item, wherein transmission of the content item to the consumer node includes transmission of the data packet to the consumer node.

In Example 33, the subject matter of Example 32 includes, wherein the interest packet is signed by a key stored in a key store maintained in a trusted execution environment.

In Example 34, the subject matter of Example 33 includes, wherein the interest packet is attested by an attestation node that executes on the ICN, wherein the attestation node is secured by a trusted execution environment.

In Example 35, the subject matter of Example 34 includes, wherein the attestation node executes as a role on a router node that operates on the ICN.

In Example 36, the subject matter of Examples 33-35 includes, wherein the key is a key generated by a manufacturer of the consumer node.

Example 37 is a system for information-centric network namespace policy-based content delivery, the system comprising: means for receiving a registration request from a node on an information-centric network (ICN); means for validating credentials of the node, wherein validating the credentials includes, verifying a security level and a category included in the credentials; means for registering the node with the ICN based on results of the validation; means for registering a set of content items associated with the node with the ICN; means for receiving an interest packet from a consumer node for a content item of the set of content items that includes an interest packet security level for the content item; means for determining compliance of the security level of the node with the interest packet security level; and means for transmitting, responsive to the compliance determination, the content item to the consumer node.

In Example 38, the subject matter of Example 37 includes, wherein the node is registered by a registration authority.

In Example 39, the subject matter of Example 38 includes, wherein the registration authority is a role assigned to a router node.

In Example 40, the subject matter of Examples 37-39 includes, wherein the content item is transmitted to the consumer node in a data packet that includes a data packet security level that allows the consumer node to verify the security level upon receipt of the data packet.

In Example 41, the subject matter of Examples 37-40 includes, wherein the set of content items are included in an ICN routing table and ICN cache upon registration with the ICN.

In Example 42, the subject matter of Examples 37-41 includes, means for determining that the interest packet has been signed with a group key; means for identifying that the node is a member of a group associated with the group key; means for validating a group signature included in the interest packet; and means for transmitting, upon validation of the group signature, the content item to the consumer node.

In Example 43, the subject matter of Example 42 includes, means for encapsulating the content item in a data packet; means for signing the data packet using the group key; and means for transmitting the data packet to the consumer node, wherein a group signature included in the data packet is used by the consumer node to validate the authenticity of the data packet.

In Example 44, the subject matter of Examples 42-43 includes, means for determining that the node is not a member of the group associated with the group key; and means for preventing transmission of the content item to the consumer node.

In Example 45, the subject matter of Example 44 includes, means for transmitting the interest packet to a second node that is member of the group to facilitate transmission of the content item to the consumer node.

In Example 46, the subject matter of Examples 37-45 includes, means for maintaining a key status blockchain for nodes on the ICN; means for validating a key status for a key associated with the consumer node; and means for transmitting the content to the consumer node based upon the validation of the key status.

In Example 47, the subject matter of Example 46 includes, means for receiving a key status update from the consumer node for the key; means for validating the key status update; means for caching the key status update in a local key status cache of the node; and means for synchronizing the key status update to other nodes of the ICN.

In Example 48, the subject matter of Example 47 includes, wherein the means for synchronizing the key status update further comprises: means for transmitting the key status update to miner nodes on the ICN; means for transmitting the key status update from the miner nodes to respective key status update subscribers of the miner nodes; and means for transmitting the key status update from router nodes to respective key status update subscribers of the router nodes.

In Example 49, the subject matter of Examples 47-48 includes, wherein the key status update is validated against a record for the key in the key status blockchain.

In Example 50, the subject matter of Examples 37-49 includes, means for identifying a set of trusted execution environment-based attestation claims and a nonce in the interest packet; and means for generating a data packet including a proof based on the set of trusted execution environment-based attestation claims, the nonce, and the content item, wherein transmitting the content item to the consumer node includes transmitting the data packet to the consumer node.

In Example 51, the subject matter of Example 50 includes, wherein the interest packet is signed by a key stored in a key store maintained in a trusted execution environment.

In Example 52, the subject matter of Example 51 includes, wherein the interest packet is attested by an attestation node executing on the ICN, wherein the attestation node is secured by trusted execution environment.

In Example 53, the subject matter of Example 52 includes, wherein the attestation node executes as a role on a router node operating on the ICN.

In Example 54, the subject matter of Examples 51-53 includes, wherein the key is a key generated by a manufacturer of the consumer node.

Example 55 is a method for information-centric network namespace policy-based content delivery, the method comprising: receiving a registration request from a node on an information-centric network (ICN); validating credentials of the node, wherein validating the credentials includes, verifying a security level and a category included in the credentials; registering the node with the ICN based on results of the validation; registering a set of content items associated with the node with the ICN; receiving an interest packet from a consumer node for a content item of the set of content items that includes an interest packet security level for the content item; determining compliance of the security level of the node with the interest packet security level; and transmitting, responsive to the compliance determination, the content item to the consumer node.

In Example 56, the subject matter of Example 55 includes, wherein the node is registered by a registration authority.

In Example 57, the subject matter of Example 56 includes, wherein the registration authority is a role assigned to a router node.

In Example 58, the subject matter of Examples 55-57 includes, wherein the content item is transmitted to the consumer node in a data packet that includes a data packet security level that allows the consumer node to verify the security level upon receipt of the data packet.

In Example 59, the subject matter of Examples 55-58 includes, wherein the set of content items are included in an ICN routing table and ICN cache upon registration with the ICN.

In Example 60, the subject matter of Examples 55-59 includes, determining that the interest packet has been signed with a group key; identifying that the node is a member of a group associated with the group key; validating a group signature included in the interest packet; and transmitting, upon validation of the group signature, the content item to the consumer node.

In Example 61, the subject matter of Example 60 includes, encapsulating the content item in a data packet; signing the data packet using the group key; and transmitting the data packet to the consumer node, wherein a group signature included in the data packet is used by the consumer node to validate the authenticity of the data packet.

In Example 62, the subject matter of Examples 60-61 includes, determining that the node is not a member of the group associated with the group key; and preventing transmission of the content item to the consumer node.

In Example 63, the subject matter of Example 62 includes, transmitting the interest packet to a second node that is member of the group to facilitate transmission of the content item to the consumer node.

In Example 64, the subject matter of Examples 55-63 includes, maintaining a key status blockchain for nodes on the ICN; validating a key status for a key associated with the consumer node; and transmitting the content to the consumer node based upon the validation of the key status.

In Example 65, the subject matter of Example 64 includes, receiving a key status update from the consumer node for the key; validating the key status update; caching the key status update in a local key status cache of the node; and synchronizing the key status update to other nodes of the ICN.

In Example 66, the subject matter of Example 65 includes, wherein synchronizing the key status update further comprises: transmitting the key status update to miner nodes on the ICN; transmitting the key status update from the miner nodes to respective key status update subscribers of the miner nodes; and transmitting the key status update from router nodes to respective key status update subscribers of the router nodes.

In Example 67, the subject matter of Examples 65-66 includes, wherein the key status update is validated against a record for the key in the key status blockchain.

In Example 68, the subject matter of Examples 55-67 includes, identifying a set of trusted execution environment-based attestation claims and a nonce in the interest packet; and generating a data packet including a proof based on the set of trusted execution environment-based attestation claims, the nonce, and the content item, wherein transmitting the content item to the consumer node includes transmitting the data packet to the consumer node.

In Example 69, the subject matter of Example 68 includes, wherein the interest packet is signed by a key stored in a key store maintained in a trusted execution environment.

In Example 70, the subject matter of Example 69 includes, wherein the interest packet is attested by an attestation node executing on the ICN, wherein the attestation node is secured by trusted execution environment.

In Example 71, the subject matter of Example 70 includes, wherein the attestation node executes as a role on a router node operating on the ICN.

In Example 72, the subject matter of Examples 69-71 includes, wherein the key is a key generated by a manufacturer of the consumer node.

Example 73 is a system to implement information-centric network namespace policy-based content delivery, the system comprising means to perform any method of Examples 55-72.

Example 74 is at least one machine-readable medium to implement information-centric network namespace policy-based content delivery, the at least one machine readable medium including instructions that, when executed by a machine, cause the machine to perform any method of Examples 55-72.

Example 75 is at least one machine-readable medium including instructions that, when executed by processing circuitry, cause the processing circuitry to perform operations to implement of any of Examples 1-74.

Example 76 is an apparatus comprising means to implement of any of Examples 1-74.

Example 77 is a system to implement of any of Examples 1-74.

Example 78 is a method to implement of any of Examples 1-74.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for information-centric network namespace policy-based content delivery, the system comprising:
   at least one processor; and
   memory including instructions that, when executed by the at least one processor, cause the at least one processor to perform operations to:
   receive a registration request from a requesting node on an information-centric network (ICN);
   validate credentials of the requesting node, wherein validation of the credentials includes verification of a security level and a category included in the credentials;
   register the requesting node with the ICN based on results of the validation;
   register a set of content items associated with the requesting node with the ICN;
   receive an interest packet from a consumer node for a content item of the set of content items that includes an interest packet security level for the content item;
   register a router as part of a group associated with a group key;
   determine that the interest packet has been signed with the group key;
   identify that the router and the requesting node are members of the group associated with the group key;
   validate a group signature included in the interest packet;
   determine compliance of the security level of the router and the requesting node with the interest packet security level; and
   transmit, responsive to the compliance determination and validation of the group signature, the content item to the consumer node,
   wherein the ICN comprises a plurality of routers, wherein each router of the plurality of routers has a policy not to deliver interest packets to other routers of the plurality of routers unless the other routers are members of the group.

2. The system of claim 1, further comprising instructions that cause the at least one processor to:
   encapsulate the content item in a data packet;
   sign the data packet with the group key; and
   transmit the data packet to the consumer node, wherein a group signature included in the data packet is used by the consumer node to validate the authenticity of the data packet.

3. The system of claim 1, further comprising: instructions that cause the at least one processor to:
   determine that the requesting node is not a member of the group associated with the group key; and
   prevent transmission of the content item to the consumer node.

4. The system of claim 1, further comprising instructions that cause the at least one processor to:
   maintain a key status blockchain for nodes on the ICN;
   validate a key status for a key associated with the consumer node; and
   transmit the content item to the consumer node based upon the validation of the key status.

5. The system of claim 4, further comprising instructions that cause the at least one processor to:
   receive a key status update from the consumer node for the key;
   validate the key status update;
   cache the key status update in a local key status cache of the requesting node; and
   synchronize the key status update to other nodes of the ICN.

6. The system of claim 5, wherein the instructions to synchronize the key status update further comprises instructions that cause the at least one processor to:
   transmit the key status update to miner nodes on the ICN;
   transmit the key status update from the miner nodes to respective key status update subscribers of the miner nodes; and
   transmit the key status update from router nodes to respective key status update subscribers of the router nodes.

7. The system of claim 1, further comprising instructions that cause the at least one processor to:
- identify a set of trusted execution environment-based attestation claims and a nonce in the interest packet; and
- generate a data packet including a proof based on the set of trusted execution environment-based attestation claims, the nonce, and the content item, wherein transmission of the content item to the consumer node includes transmission of the data packet to the consumer node.

8. At least one non-transitory machine readable medium including instructions for information-centric network namespace policy-based content delivery that, when executed by at least one processor, cause the at least one processor to perform operations to:
- receive a registration request from a requesting node on an information-centric network (ICN);
- validate credentials of the requesting node, wherein validation of the credentials includes verification of a security level and a category included in the credentials;
- register the requesting node with the ICN based on results of the validation;
- register a set of content items associated with the requesting node with the ICN;
- receive an interest packet from a consumer node for a content item of the set of content items that includes an interest packet security level for the content item;
- register a router as part of a group associated with a group key;
- determine that the interest packet has been signed with the group key;
- identify that the router and the requesting node are members of the group associated with the group key;
- validate a group signature included in the interest packet;
- determine compliance of the security level of the router and the requesting node with the interest packet security level; and
- transmit, responsive to the compliance determination and validation of the group signature, the content item to the consumer node,
- wherein the ICN comprises a plurality of routers, wherein each router of the plurality of routers has a policy not to deliver interest packets to other routers of the plurality of routers unless the other routers are members of the group.

9. The at least one non-transitory machine readable medium of claim 8, further comprising instructions that cause the at least one processor to:
- encapsulate the content item in a data packet;
- sign the data packet with the group key; and
- transmit the data packet to the consumer node, wherein a group signature included in the data packet is used by the consumer node to validate the authenticity of the data packet.

10. The at least one non-transitory machine readable medium of claim 8, further comprising instructions that cause the at least one processor to:
- determine that the requesting node is not a member of the group associated with the group key; and
- prevent transmission of the content item to the consumer node.

11. The at least one non-transitory machine readable medium of claim 8, further comprising instructions that cause the at least one processor to:
- maintain a key status blockchain for nodes on the ICN;
- validate a key status for a key associated with the consumer node; and
- transmit the content item to the consumer node based upon the validation of the key status.

12. The at least one non-transitory machine readable medium of claim 11, further comprising instructions that cause the at least one processor to:
- receive a key status update from the consumer node for the key;
- validate the key status update;
- cache the key status update in a local key status cache of the requesting node; and
- synchronize the key status update to other nodes of the ICN.

13. The at least one non-transitory machine readable medium of claim 12, wherein the instructions to synchronize the key status update further comprises instructions that cause the at least one processor to:
- transmit the key status update to miner nodes on the ICN;
- transmit the key status update from the miner nodes to respective key status update subscribers of the miner nodes; and
- transmit the key status update from router nodes to respective key status update subscribers of the router nodes.

14. The at least one non-transitory machine readable medium of claim 8, further comprising instructions that cause the at least one processor to:
- identify a set of trusted execution environment-based attestation claims and a nonce in the interest packet; and
- generate a data packet including a proof based on the set of trusted execution environment-based attestation claims, the nonce, and the content item, wherein transmission of the content item to the consumer node includes transmission of the data packet to the consumer node.

15. A method for information-centric network namespace policy-based content delivery, the method comprising:
- receiving a registration request from a requesting node on an information-centric network (ICN);
- validating credentials of the requesting node, wherein validating the credentials includes verifying a security level and a category included in the credentials;
- registering the requesting node with the ICN based on results of the validation;
- registering a set of content items associated with the requesting node with the ICN;
- receiving an interest packet from a consumer node for a content item of the set of content items that includes an interest packet security level for the content item;
- registering a router as part of a group associated with a group key;
- determining that the interest packet has been signed with the group key;
- identifying that the router and the requesting node are members of the group associated with the group key;
- validating a group signature included in the interest packet;
- determining compliance of the security level of the router and the requesting node with the interest packet security level; and
- transmitting, responsive to the compliance determination and validation of the group signature, the content item to the consumer node,
- wherein the ICN comprises a plurality of routers, wherein each router of the plurality of routers has a policy not to deliver interest packets to other routers of the plurality of routers unless the other routers are members of the group.

16. The method of claim 15, further comprising:
encapsulating the content item in a data packet;
signing the data packet using the group key; and
transmitting the data packet to the consumer node, wherein a group signature included in the data packet is used by the consumer node to validate the authenticity of the data packet.

17. The method of claim 15, further comprising:
determining that the requesting node is not a member of the group associated with the group key; and
preventing transmission of the content item to the consumer node.

18. The method of claim 15, further comprising:
maintaining a key status blockchain for nodes on the ICN;
validating a key status for a key associated with the consumer node; and
transmitting the content item to the consumer node based upon the validation of the key status.

19. The method of claim 18, further comprising:
receiving a key status update from the consumer node for the key;
validating the key status update;
caching the key status update in a local key status cache of the requesting node; and
synchronizing the key status update to other nodes of the ICN.

20. The method of claim 19, wherein synchronizing the key status update further comprises:
transmitting the key status update to miner nodes on the ICN;
transmitting the key status update from the miner nodes to respective key status update subscribers of the miner nodes; and
transmitting the key status update from router nodes to respective key status update subscribers of the router nodes.

21. The method of claim 15, further comprising:
identifying a set of trusted execution environment-based attestation claims and a nonce in the interest packet; and
generating a data packet including a proof based on the set of trusted execution environment-based attestation claims, the nonce, and the content item, wherein transmitting the content item to the consumer node includes transmitting the data packet to the consumer node.

* * * * *